US012063538B2

(12) United States Patent
Sakhnini et al.

(10) Patent No.: US 12,063,538 B2
(45) Date of Patent: Aug. 13, 2024

(54) MEASUREMENT REPORT FOR MIXED DOWNLINK REFERENCE SIGNAL REPORTING

(71) Applicant: QUALCOMM Incorporated, San Diego, CA (US)

(72) Inventors: Iyab Issam Sakhnini, San Diego, CA (US); Tao Luo, San Diego, CA (US); Wanshi Chen, San Diego, CA (US); Mahmoud Taherzadeh Boroujeni, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 275 days.

(21) Appl. No.: 17/446,797

(22) Filed: Sep. 2, 2021

(65) Prior Publication Data

US 2022/0095145 A1 Mar. 24, 2022

Related U.S. Application Data

(60) Provisional application No. 63/198,007, filed on Sep. 23, 2020.

(51) Int. Cl.
*H04W 72/04* (2023.01)
*H04L 5/00* (2006.01)
*H04W 24/10* (2009.01)
*H04W 76/00* (2018.01)
*H04W 88/08* (2009.01)

(52) U.S. Cl.
CPC ........... *H04W 24/10* (2013.01); *H04L 5/0048* (2013.01)

(58) Field of Classification Search
CPC ..... H04W 24/10; H04L 5/0048; H04L 5/0023

USPC ......................................................... 370/329
See application file for complete search history.

(56) References Cited

U.S. PATENT DOCUMENTS

| | | | |
|---|---|---|---|
| 9,900,891 B1* | 2/2018 | Islam | H04W 36/0079 |
| 11,647,525 B2* | 5/2023 | Kim | H04L 1/08 |
| | | | 370/329 |
| 2018/0062724 A1* | 3/2018 | Onggosanusi | H04B 7/0421 |
| 2019/0082363 A1* | 3/2019 | Park | H04W 24/10 |
| 2020/0021336 A1* | 1/2020 | Da Silva | H04W 36/0094 |
| 2020/0128412 A1* | 4/2020 | Kazmi | H04W 36/0085 |
| 2020/0145159 A1* | 5/2020 | Tsai | H04L 5/0051 |
| 2020/0374727 A1* | 11/2020 | Da Silva | H04W 76/27 |
| 2021/0344462 A1* | 11/2021 | Jiao | H04L 5/0094 |
| 2022/0131793 A1* | 4/2022 | Ramachandra | H04W 36/305 |
| 2022/0279360 A1* | 9/2022 | Matsumura | H04L 5/0017 |

FOREIGN PATENT DOCUMENTS

| | | | | |
|---|---|---|---|---|
| CN | 114616857 A | * | 6/2022 | H04B 17/318 |
| WO | WO-2018232090 A1 | * | 12/2018 | H04B 7/0626 |

* cited by examiner

*Primary Examiner* — Maharishi V Khirodhar
(74) *Attorney, Agent, or Firm* — Guang Yu Zhang; Harrity & Harrity, LLP

(57) ABSTRACT

Various aspects of the present disclosure generally relate to wireless communication. In some aspects, a user equipment (UE) may determine a set of measurements based at least in part on a demodulation reference signal (DMRS) transmitted via a set of beams. The UE may transmit a measurement report indicating the set of measurements based at least in part on the DMRS. Numerous other aspects are provided.

30 Claims, 16 Drawing Sheets

MEASUREMENT REPORT FOR MIXED DOWNLINK REFERENCE SIGNAL REPORTING

CROSS-REFERENCE TO RELATED APPLICATION

This patent application claims priority to U.S. Provisional Patent Application No. 63/198,007, filed on Sep. 23, 2020, entitled "MEASUREMENT REPORT FOR MIXED DOWNLINK REFERENCE SIGNAL REPORTING," and assigned to the assignee hereof. The disclosure of the prior application is considered part of and is incorporated by reference into this patent application.

INTRODUCTION

Aspects of the present disclosure generally relate to wireless communication and to techniques and apparatuses for a measurement report.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes determining a set of measurements based at least in part on a DMRS transmitted via a set of beams and transmitting a measurement report indicating the set of measurements based at least in part on the DMRS.

In some aspects, a method of wireless communication performed by a base station includes transmitting a DMRS transmitted via a set of beams and receiving, from a UE, a measurement report indicating a set of measurements based at least in part on the DMRS.

In some aspects, a UE for wireless communication includes a memory and one or more processors coupled to the memory. The one or more processors may be configured to determine a set of measurements based at least in part on a DMRS transmitted via a set of beams and transmit a measurement report indicating the set of measurements based at least in part on the DMRS.

In some aspects, a base station for wireless communication includes a memory and one or more processors coupled to the memory. The one or more processors may be configured to transmit a DMRS transmitted via a set of beams and receive, from a UE, a measurement report indicating a set of measurements based at least in part on the DMRS.

In some aspects, a non-transitory computer-readable medium storing a set of instructions for wireless communication includes one or more instructions. The one or more instructions, when executed by one or more processors of a UE, may cause the UE to determine a set of measurements based at least in part on a DMRS transmitted via a set of beams and transmit a measurement report indicating the set of measurements based at least in part on the DMRS.

In some aspects, a non-transitory computer-readable medium storing a set of instructions for wireless communication includes one or more instructions. The one or more instructions, when executed by one or more processors of a base station, may cause the base station to transmit a DMRS transmitted via a set of beams; and receive, from a UE, a measurement report indicating a set of measurements based at least in part on the DMRS.

In some aspects, an apparatus for wireless communication includes means for determining a set of measurements based at least in part on a DMRS transmitted via a set of beams and means for transmitting a measurement report indicating the set of measurements based at least in part on the DMRS.

In some aspects, an apparatus for wireless communication includes means for transmitting a DMRS transmitted via a set of beams and means for receiving, from a UE, a measurement report indicating a set of measurements based at least in part on the DMRS.

In some aspects, a method of wireless communication performed by a user equipment (UE) includes receiving configuration information for a set of measurements to be determined based at least in part on a DMRS transmitted via a set of beams and transmitting a measurement report indicating the set of measurements based at least in part on the DMRS.

In some aspects, a UE for wireless communication includes a memory and one or more processors coupled to the memory. The one or more processors may be configured to receive configuration information for a set of measurements to be determined based at least in part on a DMRS transmitted via a set of beams and transmit a measurement report indicating the set of measurements based at least in part on the DMRS.

In some aspects, a non-transitory computer-readable medium storing a set of instructions for wireless communication includes one or more instructions. The one or more instructions, when executed by one or more processors of a UE, may cause the UE to receive configuration information for a set of measurements to be determined based at least in part on a DMRS transmitted via a set of beams and transmit a measurement report indicating the set of measurements based at least in part on the DMRS.

In some aspects, an apparatus for wireless communication includes means for receiving configuration information for a set of measurements to be determined based at least in part on a DMRS transmitted via a set of beams and means for transmitting a measurement report indicating the set of measurements based at least in part on the DMRS.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
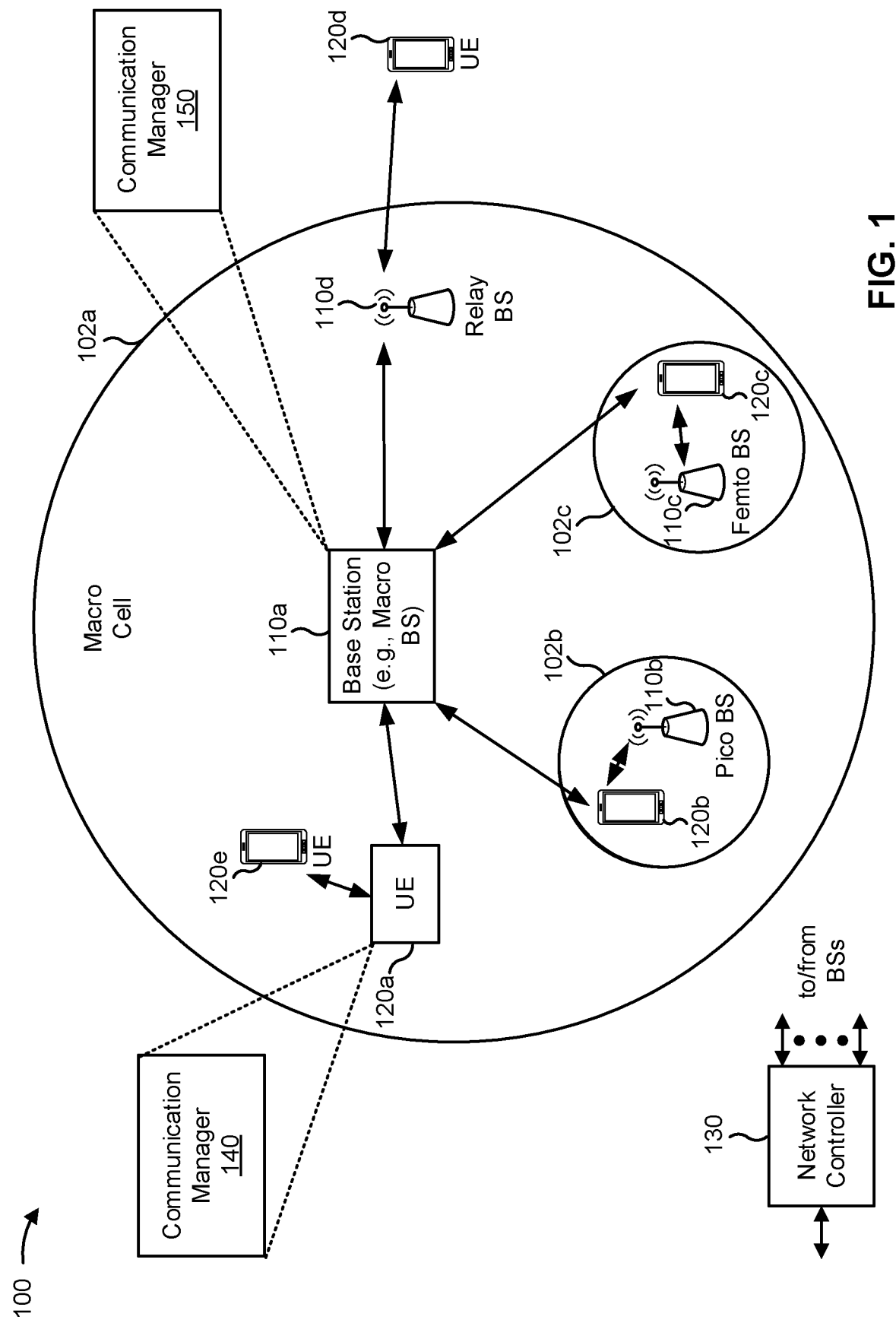
FIG. 1 is a diagram illustrating an example of a wireless network, in accordance with the present disclosure.

Different user equipment (UEs) may be associated with different levels of capabilities. For example, an Internet of Things (IoT) UE, a machine-type communication (MTC) UE, or a reduced capability (RedCap) UE may be associated with a reduced number of receive/transmit antennas, a reduced bandwidth capability, a relaxed UE processing time, a relaxed UE processing capability, a half-duplex frequency division duplexing (FDD) configuration, and so on, relative to a baseline UE such as an enhanced mobile broadband (eMBB) UE.

A UE, in a wireless network, may perform a beam management procedure to select, refine, and manage beams to be used for communication by the UE. For example, the beam management procedure may be based at least in part on a synchronization signal included in a synchronization signal block (SSB), channel state information reference signals (CSI-RS) on various beams, and/or a demodulation reference signal (DMRS), such as a DMRS associated with a physical downlink control channel (PDCCH) or a physical downlink shared channel (PDSCH), such as a PDCCH or a PDSCH that uses repetition. A PDCCH or a PDSCH that uses repetition may include a PDCCH or PDSCH that is transmitted multiple times to enable the combination of multiple transmissions of the PDCCH or PDSCH, thereby improving coverage and reliability of the PDCCH or the PDSCH. Performing a beam management procedure based at least in part on a DMRS of a PDCCH or a PDSCH as well as based at least in part on an SSB or a CSI-RS enables a reduction in bandwidth usage relative to configuring CSI-RS resources on each beam to be measured for a typical beam management procedure.

Beam management may involve reporting of measurement information to the network. For example, a UE may transmit an L1 measurement report that indicates measurements performed by the UE. An L1 measurement report is a message or a part of a message carrying information identifying one or more measurements performed by the UE. For example, an L1 measurement report may carry L1 measurement information, such as information regarding beam measurements performed by the UE. However, rules for reporting of DMRS in an L1 measurement report are not well defined, which leads to ambiguity in, for example, handling of measurement reporting across multiple DMRS ports, multiple layers, multiple TRPs, or the like. This ambiguity may result in improper L1 measurement reporting, failure to utilize the full potential of DMRS measurement reporting, and suboptimal beam management, which may leave room for improvement of operation of the wireless network.

Some techniques and apparatuses described herein provide configuration and reporting of DMRS-based L1 measurements. For example, some techniques and apparatuses described herein provide configuration information for DMRS-based L1 measurement reporting. Some techniques and apparatuses described herein provide determination (e.g., performance) of measurements based at least in part on one or more DMRSs (e.g., DMRSs associated with one or more ports, layers, TRPs, and/or the like). Furthermore, some techniques and apparatuses described herein provide generation of an L1 measurement report based at least in part on the measurements. In this way, configuration and transmission of L1 measurement reporting for DMRS-based beam management is provided, which improves the accuracy of DMRS-based L1 measurement reporting, improves utilization of DMRS-based L1 measurement reporting, and improves performance of beam management, which may improve operation of the wireless network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a communication manager 140. As described in more detail elsewhere herein, the communication manager 140 may provide means for determining a set of measurements based at least in part on a DMRS transmitted via a set of beams; and means for transmitting a measurement report indicating the set of measurements based at least in part on the DMRS. Additionally, or alternatively, the communication manager 140 may perform one or more other operations described herein.

In some aspects, the base station 110 may include a communication manager 150. As described in more detail elsewhere herein, the communication manager 150 may provide means for transmitting a DMRS transmitted via a set of beams; and means for receiving, from a UE, a measurement report indicating a set of measurements based at least in part on the DMRS. Additionally, or alternatively, the communication manager 150 may perform one or more other operations described herein.

As indicated above, FIG. 1 is provided merely as an example. Other examples may differ from what is described with regard to FIG. 1.

Figure 2:
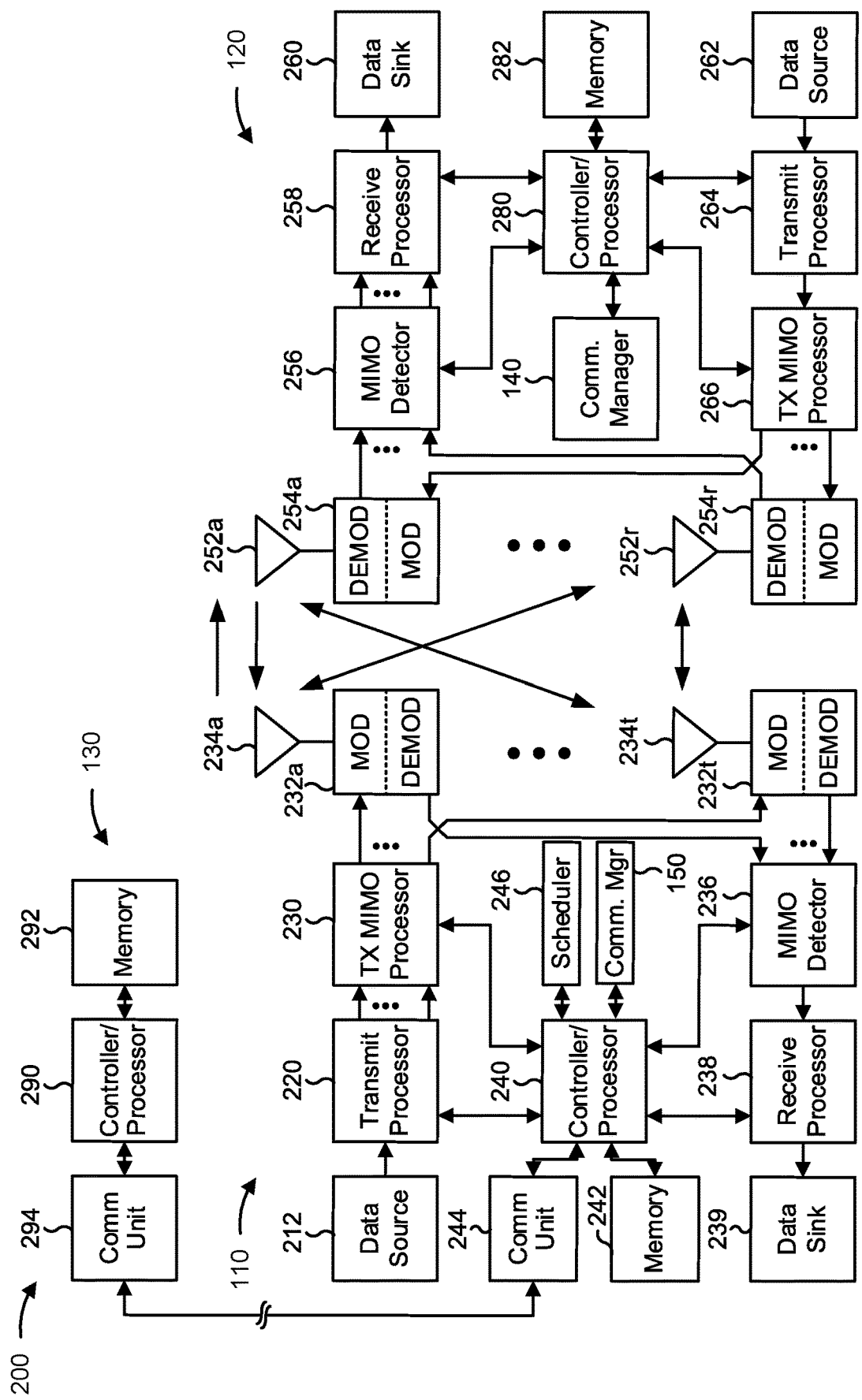
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with measurement report for mixed downlink reference signal reporting, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
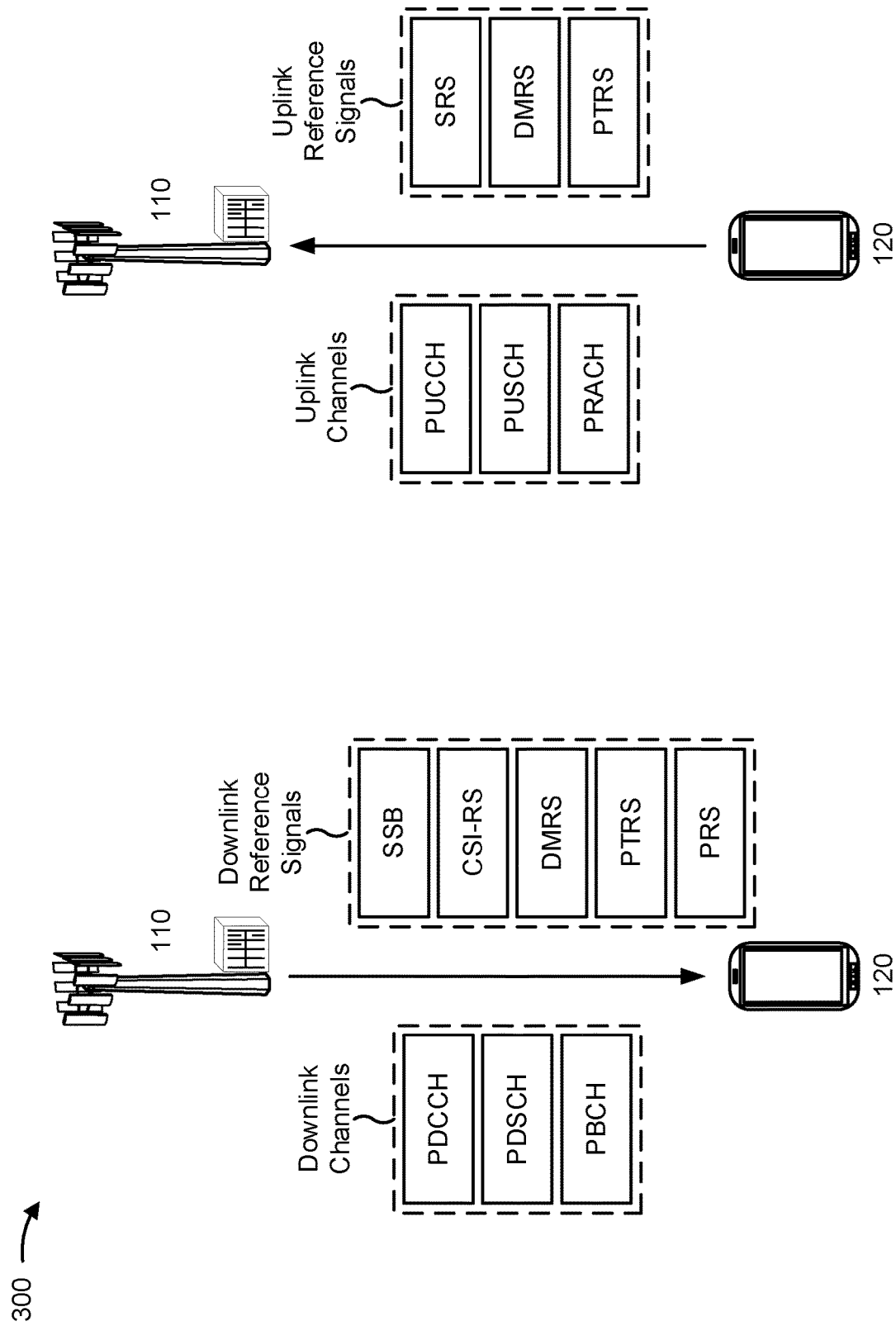
FIG. 3 is a diagram illustrating an example of physical channels and reference signals in a wireless network, in accordance with various aspects of the present disclosure.

FIG. 3 is a diagram illustrating an example 300 of physical channels and reference signals in a wireless network, in accordance with various aspects of the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
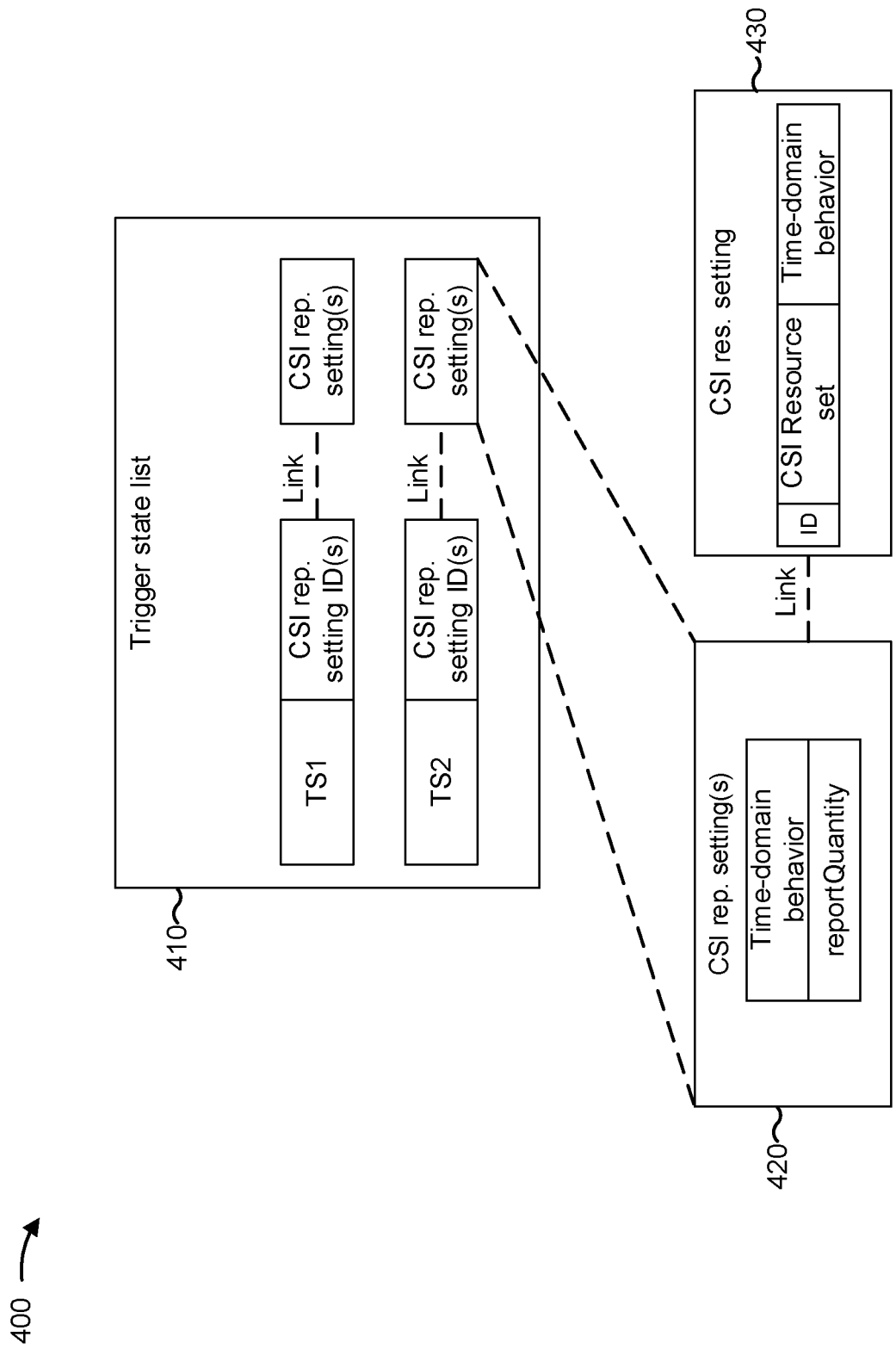
FIG. 4 is a diagram illustrating an example of configuration information related to channel state information (CSI) reporting, in accordance with various aspects of the present disclosure.

FIG. 4 is a diagram illustrating an example 400 of configuration information related to triggered CSI reporting, in accordance with various aspects of the present disclosure. The configuration information described with regard to FIG. 4 may be provided via configuration signaling, such as radio resource control (RRC) signaling and/or the like. The configuration information described with regard to FIG. 4 may indicate a configuration for determining L1 measurement information with regard to one or more beams (described in more detail elsewhere herein) and reporting the L1 measurement information in an L1 measurement report. For example, the configuration information may indicate how to determine and/or report a channel quality indicator (CQI) (e.g., a value indicating a highest modulation scheme and code rate suitable for a downlink transmission to achieve a block error rate (BLER) condition), a precoding matrix indicator (PMI) (e.g., a value indicating a proposed precoding matrix to be used for downlink communications), a layer indicator (LI) (e.g., a value indicating a proposed number of layers to be used for downlink communications), a rank indicator (RI) (e.g., a value indicating a proposed rank to be used for downlink communications), a Layer 1 reference signal received power (L1-RSRP) value, a Layer 1 signal to interference plus noise (L1-SINR) value, and/or the like.

The description of FIG. 4 relates to configuration of L1 measurement reporting for CSI-RSs and SSBs. In some aspects, the UE may be configured to perform L1 measurement reporting based at least in part on one or more DMRSs. The configuration of the UE to perform L1 measurement reporting based at least in part on one or more DMRSs is described in more detail in connection with FIGS. 7 and 8.

As shown by reference number 410, a UE may be configured with one or more lists of trigger states. As shown by reference number 420, the UE may be configured with one or more CSI reporting (rep.) settings. As shown by reference number 430, the UE may be configured with one or more CSI resource settings.

A list of trigger states may include zero or more aperiodic trigger states and zero or more semi-persistent trigger states. An aperiodic trigger state may be configured via an RRC parameter such as CSI-AperiodicTrigggerStateList. For example, and as shown, each trigger state in the RRC parameter may contain a list of associated CSI reporting settings (e.g., based at least in part on CSI reporting setting identifiers) that may indicate one or more resource set identifiers (IDs) (not shown) for channel measurement and optionally for interference measurement. A semi-persistent trigger state may be configured via an RRC parameter such as CSI-SemiPersistentOnPusch-TrigggerStateList. For example, each trigger state in the RRC parameter may be associated with one associated CSI reporting setting that indicates one or more resource set IDs for channel measurement and optionally for interference measurement.

A CSI resource setting may be configured via an RRC parameter such as CSI-ResourceConfig. The RRC parameter may configure a list of one or more CSI resource sets. A CSI resource set may indicate a set of resources on which to perform a measurement. For example, the list of one or more CSI-resource set may include one or more non-zero-power (NZP) CSI-RS resource sets (e.g., one or more resource sets in which a CSI-RS will be transmitted at non-zero power), one or more SSB sets, and/or one or more CSI interference management (CSI-IM) resource sets. In some aspects, the RRC parameter may indicate a time domain behavior of a CSI-RS resource set. For example, the RRC parameter may indicate whether the CSI-RS resources within a CSI resource setting are set to aperiodic, periodic, or semi-persistent. In some aspects, for periodic and semi-persistent CSI resource settings, the number of configurable CSI-RS resource sets may be limited to 1.

A CSI reporting setting may be configured via an RRC parameter such as CSI-ReportConfig. The RRC parameter may configure a time domain behavior for a CSI report. For example, the RRC parameter may indicate that the time domain behavior is aperiodic (where the corresponding measurement report is transmitted on a PUSCH), semi-persistent (where the corresponding measurement report is transmitted on a PUCCH and is activated/deactivated using a medium access control control element (MAC-CE), or where the corresponding measurement report is transmitted on a PUSCH and is triggered using DCI scrambled with a semi-persistent CSI radio network temporary identifier (SP-CSI-RNTI)), or periodic (e.g., where the corresponding measurement report is transmitted on a PUCCH). As further shown, the RRC parameter may indicate a report quantity. A report quantity may indicate one or more CSI-related, L1-RSRP-related, or L1-SINR-related quantities to report. For example, a reportQuantity parameter of the RRC parameter may be set to 'none', 'cri-RI-PMI-CQI', 'cri-RI-i1', 'cri-RI-i1-CQI', 'cri-RI-CQI', 'cri-RSRP', 'cri-SINR', 'ssb-Index-RSRP', 'ssb-Index-SINR' or 'cri-RI-LI-PMI-CQI'.

An aperiodic or semi-persistent trigger state may be configured via RRC signaling and triggered via DCI signaling. For example, a base station may transmit a signal (e.g., a trigger signal) based at least in part on a DCI parameter selected from a list of DCI parameters (e.g., CSI-AperiodicTriggerStateList, CSI-AperiodicTriggerStateList-ForDCI-Format0_2, CSI-SemiPersistentOnPUSCH-TriggerStateList, or CSI-SemiPersistentOnPUSCH-TriggerStateList-ForDCIFormat0_2.

In some aspects, and as shown, a link may be configured between a CSI reporting setting and a CSI resource setting. A link may indicate a relationship between a CSI reporting setting and a CSI resource setting. For example, an L1 measurement report configured by a CSI reporting setting may be based at least in part on a resource set indicated by a linked CSI resource setting. In some aspects, for aperiodic CSI (e.g., aperiodic L1 measurement reporting), each trigger state configured using a parameter CSI-AperiodicTriggerState may be associated with one or more CSI-ReportConfig parameters. In this case, each CSI-ReportConfig may be linked to one or more periodic, semi-persistent, or aperiodic resource settings. For semi-persistent or periodic CSI (e.g., semi-persistent or periodic L1 measurement reporting), each CSI-ReportConfig may be linked to one or more periodic or semi-persistent resource settings.

In some aspects, the L1 measurement report may relate to an L1-RSRP. For L1-RSRP, the UE may be configured with one or more CSI-RS resource settings indicating up to 16 CSI-RS resource sets having up to 64 resources within each set. The total number of different CSI-RS resources over all resource sets may be no more than 128. In some aspects, the L1 measurement report may relate to an L1-SINR. For L1-SINR, for channel measurement, the UE may be configured with one or more CSI-RS resource settings with up to 64 CSI-RS resources or up to 64 SSB resources.

If the UE is configured with a CSI-ReportConfig with reportQuantity set to 'cri-RSRP', 'ssb-Index-RSRP', 'cri-SINR' or 'ssb-Index-SINR', and If the UE is configured with groupBasedBeamReporting set to 'disabled', then the UE may report, in a single L1 measurement report, nrofReportedRS (in case of RSRP) or nrofReportedRSForSINR (in case of SINR) with different CSI resource indicators (CRIs) (e.g., information indicating a CSI resource associated with the L1 measurement report) or SSB resource indicators SSBRIs (e.g., information indicating an SSB resource associated with the L1 measurement report) for each reporting setting. If the UE is configured with groupBasedBeamReporting set to 'enabled', the UE may report, in a single report, two different CRIs or SSBRIs for each reporting setting. For example, the CSI-RS and/or SSB resources can be received simultaneously by the UE.

For L1-RSRP and L1-SINR reporting, if nrofReportedRS (for RSRP) or nrofReportedRSForSINR (for SINR) is one, a measurement value may be indicated using 7 bits. For L1-RSRP, if nrofReportedRS is larger than one, or if groupBasedBeamReporting is 'enabled', or For L1-SINR, if nrofReportedRSForSINR is larger than one, the UE may use differential based reporting, in which the largest measured value is quantized to 7 bits and one or more differential measurements are quantized to a 4-bit value.

As indicated above, FIG. 4 is provided as an example. Other examples may differ from what is described with regard to FIG. 4.

Figure 5:
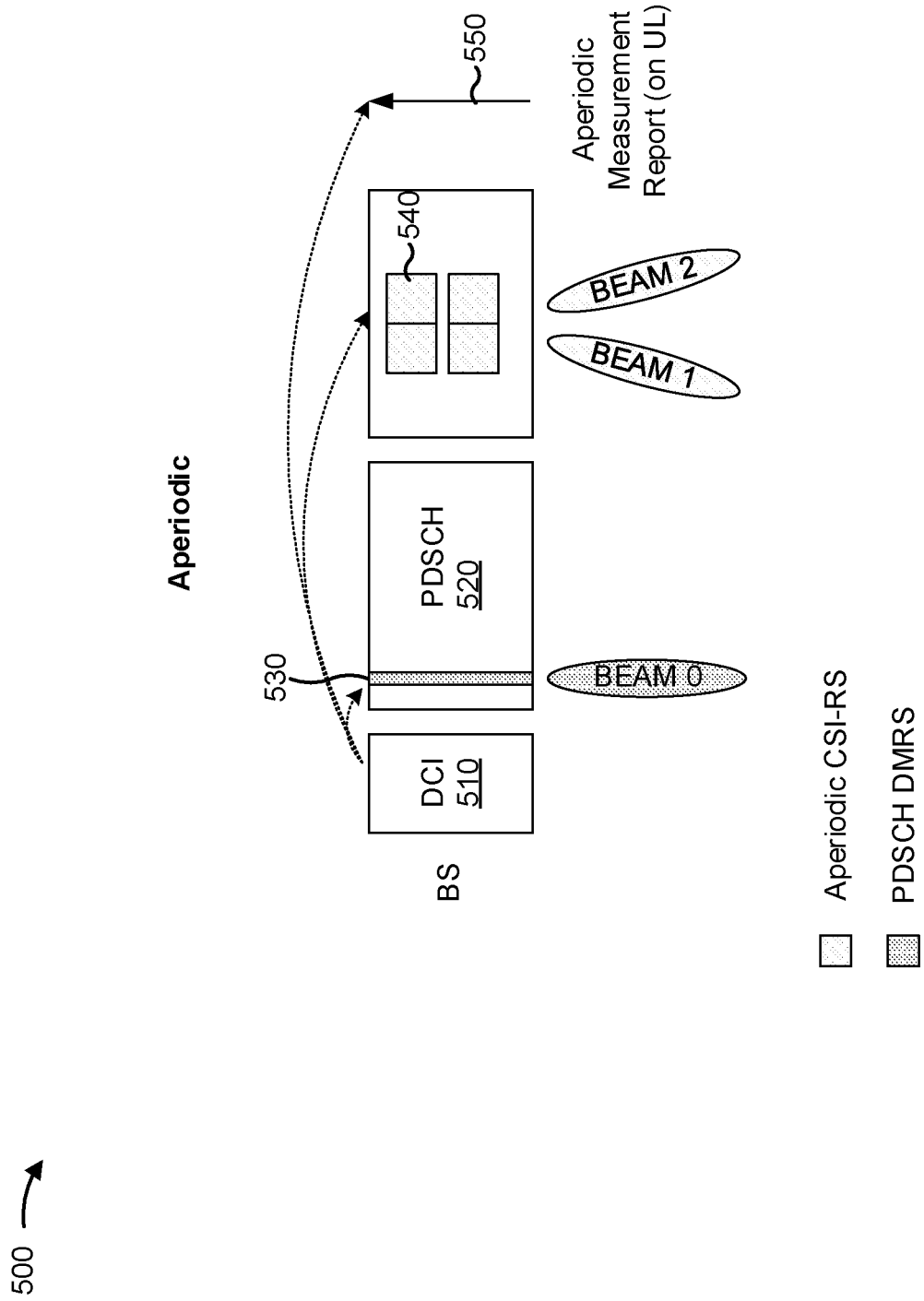
FIG. 5 is a diagram illustrating an example of an aperiodic configuration for a beam management procedure based at least in part on a demodulation reference signal (DMRS) and at least one of a channel state information reference signal (CSI-RS) or a synchronization signal and physical broadcast channel block (SSB), in accordance with various aspects of the present disclosure.

FIG. 5 is a diagram illustrating an example 500 of an aperiodic configuration for a beam management procedure based at least in part on a DMRS and at least one of a CSI-RS or an SSB, in accordance with various aspects of the present disclosure. For example, this aperiodic configuration may be used for a beam management procedure. A beam management procedure is a procedure for selecting and/or refining beams used for communication between two wireless communication devices, such as a UE and a base station. For example, a UE may perform measurements based at least in part on various reference signals (e.g., a DMRS, an SSB, and/or a CSI-RS), and may report information regarding the measurements to a base station. The information regarding the measurements may indicate one or more selected beams, one or more preferred beams, measurement information (e.g., measurement values), and/or the like. In some aspects, the UE may report the information regarding the measurements in accordance with a configuration, such as the configuration described with regard to FIG. 4. In some aspects, the beam management procedure may be a mixed beam management procedure. A mixed beam management procedure is a beam management procedure that uses a DMRS and at least one of an SSB or a CSI-RS.

As shown in FIG. 5, a BS may transmit downlink control information (DCI) 510. The DCI 510 may schedule a PDSCH 520. The PDSCH 520 may include a DMRS 530 that is transmitted on a beam 0. Furthermore, the DCI 510 may schedule a set of aperiodic CSI-RSs 540 on beams 1 and 2. Still further, the DCI 510 may schedule an aperiodic measurement report 550 on an uplink of the UE 120. The UE 120 may transmit the measurement report on the uplink. Thus, example 500 can be considered an example of explicit indication of which resources (e.g., SSB resources, CSI-RS resources, DMRS resources) to include in the beam management procedure. In example 500, the explicit indication is the DCI 510. In some aspects, the explicit indication may be a MAC signal, such as a MAC control element (CE).

In the techniques and apparatuses described herein, reference signals are transmitted and received via beams. A beam may be generated using beamforming. Beamforming, which may also be referred to as spatial filtering, directional transmission, or directional reception, is a signal processing technique that may be used at a transmitting device or a receiving device (e.g., a base station 110 or a UE 120) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the transmitting device or receiving device. The adjustments associated with each of the antenna elements may be defined by a beamforming weight set associated with a particular orientation (e.g., with respect to the antenna array of the transmitting device or receiving device, or with respect to some other orientation).

In one example, a base station 110 may use multiple antennas or antenna arrays to conduct beamforming operations for directional communications with a UE 120. For instance, some signals (e.g., synchronization signals, reference signals, beam management signals, or other control signals) may be transmitted by a base station 110 multiple times in different directions, which may include a signal being transmitted according to different beamforming weight sets associated with different directions of transmission. Transmissions in different beam directions may be used to identify (e.g., by the base station 110 or a receiving device, such as a UE 120) a beam direction for subsequent transmission and/or reception by the base station 110. Some signals, such as data signals associated with a particular receiving device, may be transmitted by a base station 110 in a single beam direction (e.g., a direction associated with the receiving device, such as a UE 120). In some examples, the beam direction associated with transmissions along a single beam direction may be determined based at least in in part on a signal that was transmitted in different beam directions. For example, a UE 120 may receive one or more of the signals transmitted by the base station 110 in different directions, and the UE 120 may report to the base station 110 an indication of the signal that the UE 120 received with a highest signal quality, or an otherwise acceptable signal quality, as described in more detail elsewhere herein. Although these techniques are described with reference to signals transmitted in one or more directions by a base station 110, a UE 120 may employ similar techniques for transmitting signals multiple times in different directions (e.g., for identifying a beam direction for subsequent transmission or reception by the UE 120), or transmitting a signal in a single direction (e.g., for transmitting data to a receiving device).

A receiving device (e.g., a UE 120, which may be an example of a mmW receiving device) may try multiple receive beams when receiving various signals from the base station 110, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based on listening according to multiple beam directions).

Figure 7:
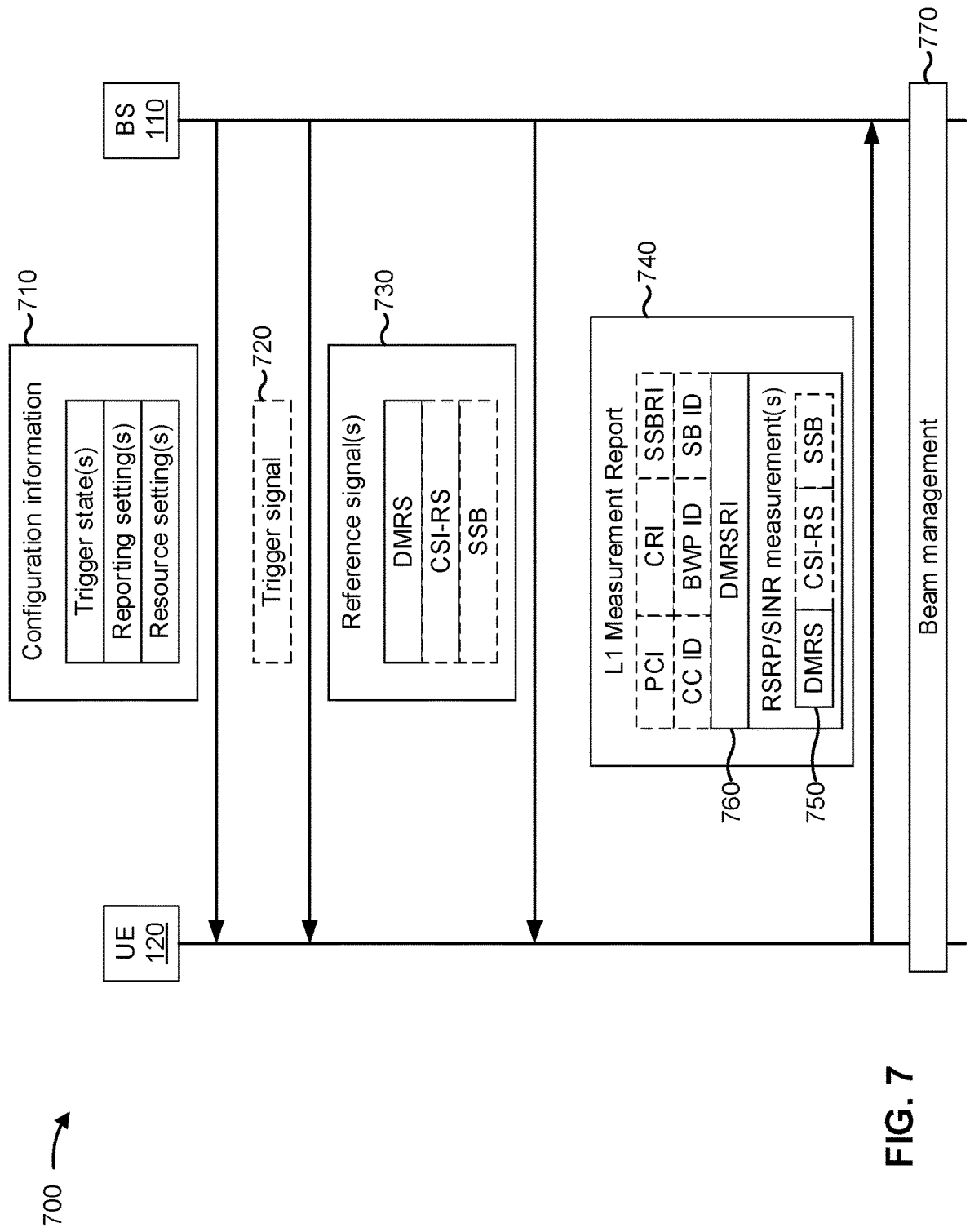
FIG. 7 is a diagram illustrating an example of signaling associated with Layer 1 (L1) measurement reporting of a DMRS based measurement, in accordance with various aspects of the present disclosure.
Figure 8:
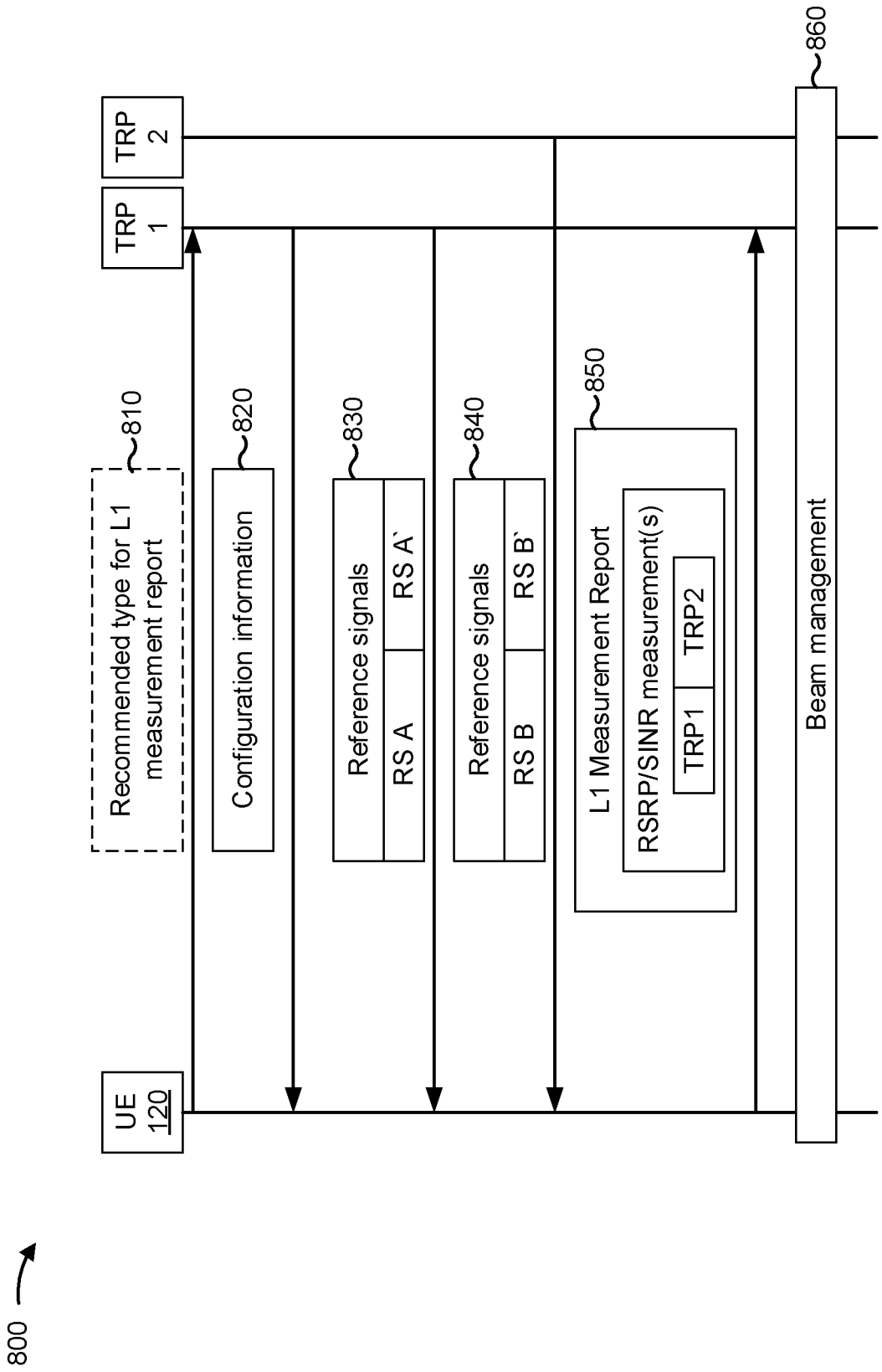
FIG. 8 is a diagram illustrating an example of signaling associated with L1 measurement reporting of a DMRS based measurement for multiple transmit/receive points (TRPs), in accordance with various aspects of the present disclosure.

In some aspects, an L1 measurement report may be used to send CSI-RS, SSB, or DMRS reference signal received power (RSRP) or signal to interference plus noise (SINR) measurements. For example, the L1 measurement report may be set to be periodic, aperiodic or semi-persistent. In some aspects, up to 4 CSI-RS resource indicators (CRIs) and/or SSB resource indicators (SSBRI) L1 measurement reports may be transmitted per CSI reporting settings, as described in more detail elsewhere herein. For example, an L1 measurement report may include 7 bits for the strongest measurements, then 4 bits for each of the 3 remaining measurements (e.g., indicating a differential with regard to the strongest measurement). In some aspects, multiple measurement reports (e.g., based at least in part on multiple reporting settings) may be sent in a single PUCCH or PUSCH. For example, the number of measurement reports that can be transmitted in a single PUCCH or PUSCH may be limited by the PUCCH/PUSCH payload size. If the payload size is not sufficient, then one or more measurements reports with a lowest priority may be dropped. Some techniques and apparatuses described herein, such as described with regard to FIGS. 7 and 8, provide configurations for reporting DMRS measurement information in an L1 measurement report.

As indicated above, FIG. 5 is provided as an example. Other examples may differ from what is described with regard to FIG. 5.

Figure 6:
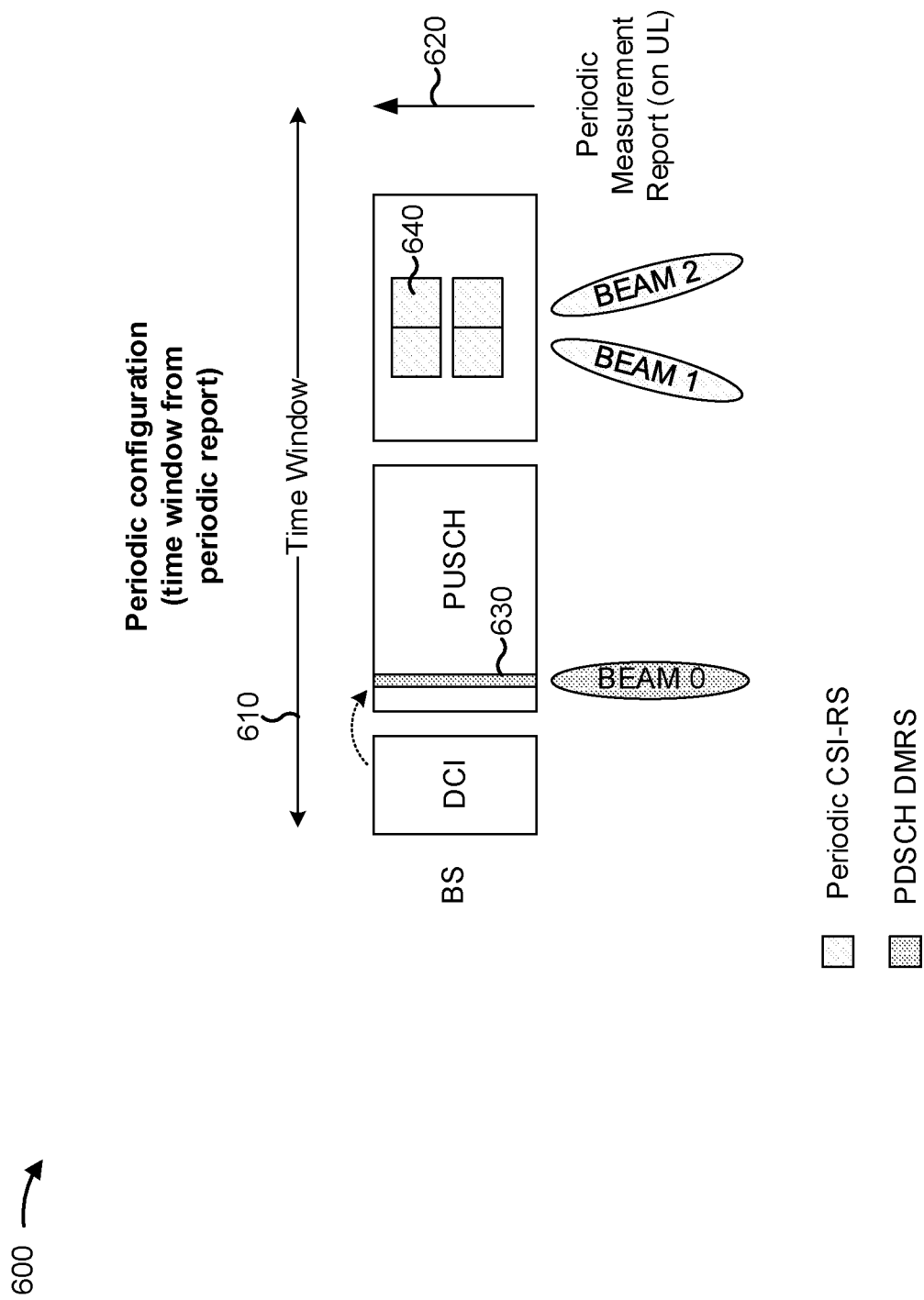
FIG. 6 is a diagram illustrating an example of a time window-based configuration for a beam management procedure based at least in part on a combination of a DMRS and at least one of a CSI-RS or an SSB, in accordance with various aspects of the present disclosure.

FIG. 6 is a diagram illustrating an example 600 of a time window-based configuration for a beam management procedure based at least in part on a combination of a DMRS and at least one of a CSI-RS or an SSB, in accordance with various aspects of the present disclosure. For example, this aperiodic configuration may be used for a beam management procedure, such as a mixed beam management procedure. A time window 610 may be measured backward from a time associated with a periodic measurement report 620. Reference signals included in the time window 610, such as the DMRS 630 and the periodic CSI-RSs 640, are used for the beam management procedure.

In some aspects, configuration information may indicate the resources to be used for the beam management procedure based at least in part on the time window 610. For example, a resource (such as an SSB resource, a CSI-RS resource, or a DMRS resource) that is included in the time window may be used for the beam management procedure. In some aspects, a start or end of the time window may correspond to transmission of a measurement report. For example, the time window may include a length of time preceding a time at which the measurement report is to be transmitted. In some aspects, a start or end of the time window may correspond to reception of a grant. For example, the time window may include a length of time preceding a time at which the grant is received by the UE 120. A grant is a communication (e.g., DCI) that identifies a resource that can be used by a recipient of the grant for communication.

In some aspects, a start or end of the time window may correspond to a semi-persistent scheduling (SPS) occasion. For example, the time window may include a length of time preceding or following a time at which an SPS transmission is to be performed by the UE 120 or the BS 110. An SPS occasion is a resource that is configured to be available for a communication by the UE 120 or the BS 110 in a recurring fashion. An SPS allocation can be activated or deactivated. In some aspects, a start or end of the time window may correspond to a control resource set (CORESET). For example, the time window may include a length of time preceding or following a time associated with the CORESET. In some aspects, a start or end of the time window may correspond to reception or transmission of a triggering signal. For example, the time window may include a length of time preceding or following a time at which the triggering signal is received by the UE 120. A triggering signal is a signal that triggers a beam management operation. The triggering signal can include RRC signaling, MAC signaling, DCI, a reference signal, and/or the like.

As indicated above, FIG. 6 is provided as an example. Other examples may differ from what is described with regard to FIG. 6.

FIG. 7 is a diagram illustrating an example 700 of signaling associated with L1 measurement reporting of a DMRS based measurement, in accordance with various aspects of the present disclosure. As shown, FIG. 7 includes a UE 120 and a BS 110. Dashed boxes indicate optional operations.

As shown in FIG. 7, and by reference number 710, the BS 110 may transmit configuration information to the UE 120. The configuration information may indicate a configuration for L1 measurement reporting based at least in part on a DMRS. In some aspects, the configuration information may include one or more of the RRC parameters described with regard to FIG. 4. For example, the configuration information may indicate one or more trigger states, one or more reporting settings, one or more resource settings, and/or the like. In some aspects, the configuration information may indicate how the UE 120 is to determine a DMRS-based CSI measurement and report the DMRS-based CSI measurement in an L1 measurement report.

In some aspects, the configuration information may indicate that a DMRS-based measurement (e.g., an RSRP measurement and/or an SINR measurement) and another measurement (e.g., an RSRP measurement and/or an SINR measurement based at least in part on a CSI-RS and/or an SSB) are to be included in the L1 measurement report. For example, for aperiodic CSI, each trigger state configured using a parameter CSI-AperiodicTrigger State may be associated with one or more CSI-ReportConfig reporting settings, and each CSI-ReportConfig reporting setting may be linked to one or more periodic, semi-persistent, or aperiodic resource settings. For periodic or semi-persistent CSI, each CSI-ReportConfig reporting setting may be linked to one or more periodic or semi-persistent resource settings.

In some aspects, the configuration information may indicate one or more DMRSs based at least in part on which to generate the L1 measurement report. For example, the configuration information may indicate one or more DMRSs to be included in the report. For aperiodic CSI, a trigger state (e.g., each trigger state) configured using a parameter CSI-AperiodicTriggerState may be associated with one or more CSI-ReportConfig reporting settings. For example, a CSI-ReportConfig (e.g., each reporting setting) may be linked to one or more DMRSs through an explicit indication in a triggering signal (e.g., a triggering message). The triggering message is shown by reference number 720, and may include RRC signaling, MAC signaling, DCI, a physical layer signal, and/or the like. As another example, a CSI-ReportConfig (e.g., each reporting setting) may be linked to one or more DMRSs based at least in part on one or more rules, such as a predefined rule. For periodic or semi-persistent CSI, a CSI-ReportConfig (e.g., each reporting setting) may be linked to one or more DMRSs based at least in part on one or more rules, such as a predefined rule. The one or more rules may be configured via higher-layer signaling, such as RRC signaling. For example, the one or more rules may be configured as part of the configuration information shown by reference number 710, or via other RRC signaling.

In some aspects, a rule, of the one or more rules, may be based at least in part on a time reference. For example, the time reference may be an L1 measurement report, a grant, an SPS occasion, a CORESET, a trigger signal (e.g., as shown by reference number 720), and/or the like. In some aspects, the rule may indicate that N DMRS symbols before and/or after a time reference are to be used for the L1 measurement report, where N is signaled (e.g., in the configuration information or separately from the configuration information). In some aspects, the rule may indicate that DMRS symbols included in N slots or mini-slots before and/or after a time reference are to be used for the L1 measurement report, where Nis signaled (e.g., in the configuration information or separately from the configuration information). A slot may include a set number of OFDM symbols (e.g., 14 for normal cyclic prefix or 12 for extended cyclic prefix). A mini-slot is a group of 2, 4, or 7 OFDM symbols, and can be positioned asynchronously with the start of a slot. In some aspects, a time period (e.g., a slot or a mini-slot) may include a plurality of DMRSs. In some aspects, if the time period includes a plurality of DMRSs, the UE 120 may use an average measurement associated with the plurality of DMRSs. In some aspects, if the time period includes a plurality of DMRSs, the UE 120 may use a best measurement associated with the plurality of DMRSs. In some aspects, if the time period includes a plurality of DMRSs, the UE 120 may use a worst measurement associated with the plurality of DMRSs. As used herein, a best measurement is a measurement with a highest SINR or a highest RSRP. As used herein, a worst measurement is a measurement with a lowest SINR or a lowest RSRP.

In some aspects, a rule may be based at least in part on whether a DMRS is directed to the UE 120. For example, the UE 120 may include, in an L1 measurement report, CSI based at least in part on a DMRS if the DMRS is directed to the UE 120. If a DMRS is not directed to the UE 120, then the UE 120 may not include a measurement associated with the DMRS in an L1 measurement report. In some aspects, the UE 120 may determine that a DMRS is directed to a UE 120 if the DMRS is associated with a message with a passing cyclic redundancy check (CRC). A CRC is a parity check that may be attached to a series of bits. If the UE 120 decodes data and determines that the CRC matches a CRC associated with the decoded data, then the UE 120 may determine that no error is associated with the data. The CRC may be scrambled by a radio network temporary identifier (RNTI) that is specific to the UE 120, so that the UE 120 can determine whether the DMRS is directed to the UE 120 based at least in part on whether the UE 120 can unscramble the CRC using the RNTI that is specific to the UE 120. In some aspects, the UE 120 may determine that a DMRS is directed to the UE 120 if the DMRS is associated with a virtual cell identifier (VCID) corresponding to the UE 120.

In some aspects, a rule may indicate that measurements regarding DMRSs associated with a particular layer or set of layers are to be included in an L1 measurement report. In some aspects, a rule may indicate that measurements regarding DMRSs associated with a particular port (e.g., a particular DMRS port) or set of ports are to be included in an L1 measurement report. In some aspects, a rule may indicate that measurements regarding DMRSs associated with a particular layer and a particular port are to be included in an L1 measurement report.

In some aspects, a rule may indicate that measurements regarding DMRSs associated with a particular SPS identifier or set of SPS identifiers are to be included in an L1 measurement report. In some aspects, a rule may indicate that measurements regarding DMRSs associated with a particular CORESET identifier or set of CORESET identifiers are to be included in an L1 measurement report. In some aspects, a rule may indicate that measurements regarding DMRSs associated with a particular SPS identifier and a particular CORESET identifier are to be included in an L1 measurement report.

In some aspects, a rule may indicate that measurements regarding DMRSs associated with a particular TCI state or set of TCI states are to be included in an L1 measurement report. In some aspects, a rule may indicate that measurements regarding DMRSs associated with a particular quasi-colocation (QCL) state or set of QCL states (e.g., a particular QCL source or set of QCL sources) are to be included in an L1 measurement report.

In some aspects, a resource setting of the configuration information may indicate DMRSs for which measurements are to be included in an L1 measurement report. For example, the resource setting may be defined for DMRSs, and may indicate any one or combination of the above-described rules.

As shown by reference number 720, and as described above, in some aspects, the BS 110 may transmit a trigger signal. The trigger signal may cause the UE 120 to determine measurements for a set of reference signals in accordance with the configuration information. In some aspects, the BS 110 may not trigger the determination of the measurements. For example, the UE 120 may determine the measurements based at least in part on a periodic configuration, as described in more detail elsewhere herein.

As shown by reference number 730, the BS 110 may transmit a set of reference signals to the UE 120. The set of reference signals may include one or more DMRSs, which may be transmitted on a set of beams. In some aspects, the set of reference signals may include one or more CSI-RSs and/or one or more SSBs. The BS 110 may transmit the set of reference signals based at least in part on the configuration information. For example, the BS 110 may transmit the set of reference signals via a set of resources indicated by the configuration information, as described in more detail elsewhere herein.

As shown by reference number 740, the UE 120 may transmit an L1 measurement report. The L1 measurement report may be based at least in part on the set of reference signals and/or may be based at least in part on the configuration information. The UE 120 may determine the L1 measurement report based at least in part on the configuration information. For example, the UE 120 may determine (e.g., perform) a set of measurements on the set of reference signals as indicated by the configuration information, and may transmit, in the L1 measurement report, information indicating the set of measurements. As shown by reference number 750, the L1 measurement report may include a measurement (e.g., an RSRP measurement and/or an SINR measurement) based at least in part on a DMRS, and may optionally include a measurement based at least in part on an SSB and/or a CSI-RS.

As shown by reference number 760, in some aspects, the L1 measurement report may include a DMRS resource indicator (DMRSRI). A DMRSRI may indicate a DMRS for which a measurement is reported. In some aspects, the DMRSRI may be based at least in part on a quasi-colocated resource indicator. For example, the DMRSRI may be based at least in part on a quasi-colocated SSBRI or a quasi-colocated CRI. For example, a DMRS may be quasi-colocated with a source signal, which may be an SSB or a CSI-RS. The L1 measurement report may indicate a resource associated with the DMRS based at least in part on a resource associated with the source signal based at least in part on the DMRS and the source signal being quasi-colocated with each other.

In some aspects, the DMRSRI may be based at least in part on a preconfigured indicator. For example, the DMRSRI may map a DMRS to a time relative to a time reference (e.g., a first index (e.g., 01) for a DMRS closest in time to the L1 measurement report, a second index (e.g., 02) for a DMRS second-closest in time to the L1 measurement report, and so on). As another example, the DMRSRI may indicate a DMRS resource based at least in part on a layer identifier associated with the DMRS resource. As yet another example, the DMRSRI may indicate a DMRS resource based at least in part on a port identifier associated with the DMRS resource. As still another example, the DMRSRI may indicate a DMRS based at least in part on a TCI state associated with the DMRS resource.

In some aspects, a DMRSRI may indicate a DMRS resource associated with an average measurement. For example, the average measurement may be determined based at least in part on multiple DMRS resources (e.g., across ports, across layers, across TRPs, and/or the like). In some examples, the DMRSRI may indicate the multiple DMRS resources used to determine the average measurement.

As further shown, in some aspects, the L1 measurement report may indicate at least one of: a physical cell identifier (PCI) associated with a DMRS, a CRI associated with a CSI-RS for which the L1 measurement report indicates a measurement, an SSBRI associated with an SSB for which the L1 measurement report indicates a measurement, a component carrier identifier (CC ID) indicating a component carrier in which a DMRS was transmitted, a bandwidth part identifier (BWP ID) indicating a bandwidth part in which a DMRS was transmitted, a subband identifier (SB ID) indicating a subband in which a DMRS was transmitted, and/or the like.

In some aspects, the L1 measurement report may indicate a group of measurements. For example, the L1 measurement report may indicate a plurality of measurements which are grouped into one or more groups. A group of measurements may be based at least in part on, for example, reference signals transmitted by a same TRP, all CSI-RS measurements, all DMRS measurements, all references signals in the same subband, all measurements associated with a particular reporting setting, or the like. In some aspects, a group of measurements may be indicated by absolute values of each measurement. In some aspects, the L1 measurement report may indicate a measurement for a particular measurement of a group of measurements (e.g., a best measurement, a strongest measurement, and/or the like), and may indicate one or more differential values that identify one or more remaining measurements of the group of measurements. In some aspects, the group of measurements may be based at least in part on reference signals associated with the same quasi-colocation source (e.g., an SSB). In such a case, the L1 measurement report may indicate an absolute value for the quasi-colocation source and one or more differential values for one or more remaining measurements of the group of measurements.

In some aspects, a plurality of measurements identified by the L1 measurement report may be based at least in part on multiple ports (e.g., multiple DMRS ports). In some aspects, the L1 measurement report may indicate a measurement per port of the multiple ports. In some aspects, the L1 measurement report may indicate a measurement for a best port (e.g., a measurement associated with a best value) of the multiple ports. In some aspects, the L1 measurement report may indicate a combined average measurement across the multiple ports.

As shown by reference number 770, the UE 120 and the BS 110 may perform beam management based at least in part on the L1 measurement report. For example, the BS 110 may configure a communication with the UE 120 based at least in part on the L1 measurement report. As another example, the BS 110 or the UE 120 may select one or more beams based at least in part on the L1 measurement report. As still another example, the BS 110 may trigger further measurement by the UE 120 based at least in part on the L1 measurement report.

As indicated above, FIG. 7 is provided as an example. Other examples may differ from what is described with regard to FIG. 7.

FIG. 8 is a diagram illustrating an example 800 of signaling associated with L1 measurement reporting of a DMRS based measurement for multiple TRPs, in accordance with various aspects of the present disclosure. As shown, FIG. 8 includes a UE 120, a first TRP (e.g., TRP 1), and a second TRP (e.g., TRP 2). A TRP may include a base station, an antenna panel of a base station, an antenna sub-panel, and/or the like. In some aspects, the first TRP and the second TRP may be associated with the same base station (e.g., the same gNB). In some aspects, the first TRP and the second TRP may be associated with different base stations (e.g., different gNBs). In some aspects, the first TRP and the second TRP may be scheduled separately from one another (e.g., by transmitting respective DCI). In some aspects, the first TRP and the second TRP may be scheduled jointly (e.g., by a single DCI). The first TRP and the second TRP may be spatially separate from each other. Therefore, the first TRP and the second TRP may communicate using different TCI states and/or different quasi-colocation configurations. While FIG. 8 includes a first TRP and a second TRP, the techniques described with regard to FIG. 8 can be applied for any number of TRPs (e.g., with corresponding TCI states).

As shown in FIG. 8, and by reference number 810, in some aspects, the UE 120 may transmit information indicating a recommended type for an L1 measurement report. For example, the UE 120 may transmit this information prior to receiving configuration information or a reference signal from the TRP 1 or the TRP 2. In some aspects, the information may indicate whether to configure an RSRP-based L1 measurement report or an SINR-based L1 measurement report, one or more DMRS ports for the L1 measurement report, whether the L1 measurement report should cover a CSI-RS and/or an SSB, a number of RSs for the L1 measurement report, and/or the like. Thus, the UE 120 may request an L1 measurement report configuration, which may enable the BS 110 to configure an L1 measurement report that is beneficial to the UE 120. As just one example, a high-power UE 120 may benefit from SINR-based L1 measurement reporting, whereas a low-power UE 120 may benefit from RSRP-based L1 measurement reporting. In some aspects, the UE 120 of example 800 may transmit information indicating a recommended type for an L1 measurement report.

As shown by reference number 820, the UE 120 may receive configuration information from the TRP 1. The configuration information may include at least part of the information described with regard to FIG. 4 and/or FIG. 7. In some aspects, the configuration information may indicate one or more parameters relating to L1 measurement reporting for multi-TRP deployments. For example, the configuration information may indicate a maximum number of reported TRPs associated with the L1 measurement report per reporting setting. Additionally, or alternatively, a wireless communication standard may specify the maximum number of reported TRPs associated with the L1 measurement report per reporting setting. In some aspects, the configuration information or a wireless communication standard may indicate a maximum number of reported RSs (e.g., per TRP or total) or a maximum number of reported RSs per type of RS (e.g., for DMRS, for SSB, or for CSI-RS) (e.g., per TRP or total). For example, the configuration information or the wireless communication standard may indicate, for a DMRS, a maximum total number of DMRSs that can be reported or a maximum number of DMRSs per layer and/or per port that can be reported.

As shown by reference number 830, the TRP 1 may transmit a plurality of reference signals (shown as RS A and RS A'). For example, the reference signals transmitted by the TRP 1 may include DMRSs and/or one or more other reference signals (e.g., a CSI-RS and/or an SSB). As shown by reference number 840, the TRP 2 may transmit a plurality of reference signals (shown as RS B and RS B'). For example, the reference signals transmitted by the TRP 2 may include DMRSs and/or one or more other reference signals (e.g., a CSI-RS and/or an SSB). In some aspects, the TRP 1 and/or the TRP 2 may transmit the plurality of reference signals using repetition. For example, RS A' may be a repetition of RS A, and/or RS B' may be a repetition of RS B.

As shown by reference number 850, the UE 120 may determine and transmit an L1 measurement report based at least in part on the reference signals transmitted by the TRP 1 and the TRP 2. For example, the L1 measurement report may indicate one or more measurements associated with the TRP 1 and/or the TRP 2. In some aspects, the L1 measurement report may indicate a measurement associated with a best DMRS associated with a TCI state. For example, the L1 measurement report may indicate a measurement associated with a best DMRS transmitted by the TRP 1 and a best DMRS transmitted by the TRP 2. In some aspects, the L1 measurement report may indicate an average of measurements for all DMRS with a given TCI state (e.g., (A+A')/2 or (B+B')/2). In some aspects, the L1 measurement report may indicate a combined average of all measurements associated with all TCIs (e.g., (A+A'+B+B')/4). In some aspects, the L1 measurement report may indicate a measurement associated with a best DMRS associated with a DMRS port of a plurality of DMRS ports. For example, the L1 measurement report may indicate a measurement associated with a best DMRS transmitted via a first DMRS port, a best DMRS transmitted via a second DMRS port, and so on. In some aspects, the L1 measurement report may indicate an average of measurements for all DMRS with a given DMRS port. In some aspects, the L1 measurement report may indicate a combined average of all measurements associated with all DMRS ports.

As shown by reference number 860, the UE 120, the TRP 1, and/or the TRP 2 may perform beam management based at least in part on the L1 measurement report, which is described in more detail in connection with FIG. 7.

As indicated above, FIG. 8 is provided as an example. Other examples may differ from what is provided with regard to FIG. 8.

Figure 9:
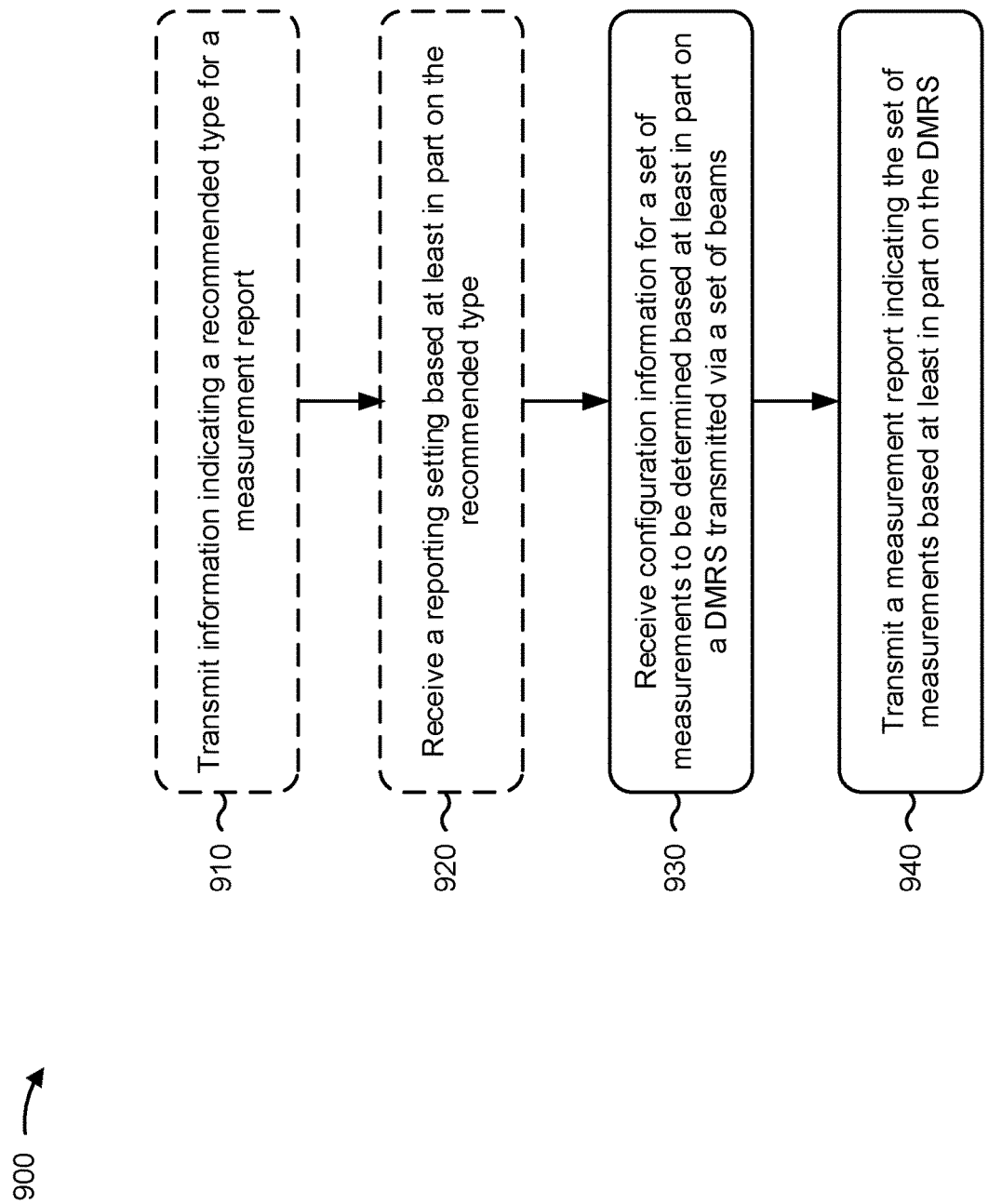
FIGS. 9-10 are diagrams illustrating example processes associated with L1 measurement reporting of a DMRS based measurement, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120) performs operations associated with a measurement report for mixed downlink reference signal reporting. Dashed blocks indicate optional steps.

As shown in FIG. 9, in some aspects, process 900 may include transmitting information indicating a recommended type for a measurement report (block 910). For example, the UE (e.g., using transmission component 1104, depicted in FIG. 11) may transmit information indicating a recommended type for a measurement report, as described above.

As shown in FIG. 9, in some aspects, process 900 may include receiving a reporting setting based at least in part on the recommended type (block 920). For example, the UE (e.g., using reception component 1102, depicted in FIG. 11) may receive a reporting setting based at least in part on the recommended type, as described above.

As shown in FIG. 9, in some aspects, process 900 may include receiving configuration information for a set of measurements to be determined based at least in part on a DMRS transmitted via a set of beams (block 930). For example, the UE (e.g., using determination component 1108, depicted in FIG. 11) may receive configuration. In some aspects, the configuration information may include the reporting setting. For example, block 920 may be combined with or included in block 930, or process 900 may not include block 920. In some aspects, the configuration information may configure the UE to perform a set of measurements based at least in part on a DMRS transmitted via a set of beams, as described above. In some aspects, the set of measurements may be based at least in part on the reporting setting.

As further shown in FIG. 9, in some aspects, process 900 may include transmitting a measurement report indicating the set of measurements based at least in part on the DMRS (block 940). For example, the UE (e.g., using transmission component 1104, depicted in FIG. 11) may transmit a measurement report indicating the set of measurements based at least in part on the DMRS, as described above.

Process 900 may include additional aspects, such as any single aspect or any combination of aspects described below and/or in connection with one or more other processes described elsewhere herein.

In a first aspect, the measurement report indicates at least one of a measurement based at least in part on a synchronization signal and physical broadcast channel block, or a measurement based at least in part on a channel state information reference signal.

In a second aspect, alone or in combination with the first aspect, the measurement report is based at least in part on a reporting setting linked to the DMRS transmitted via the set of beams.

In a third aspect, alone or in combination with one or more of the first and second aspects, the measurement report is based at least in part on an aperiodic trigger state indicating the reporting setting.

In a fourth aspect, alone or in combination with one or more of the first through third aspects, the measurement report is based at least in part on a periodic or semi-persistent trigger state associated with the reporting setting.

In a fifth aspect, alone or in combination with one or more of the first through fourth aspects, the reporting setting is linked to the DMRS transmitted via the set of beams based at least in part on a time interval between the DMRS and a time reference.

In a sixth aspect, alone or in combination with one or more of the first through fifth aspects, the reporting setting is linked to the DMRS based at least in part on the DMRS being directed to the UE.

In a seventh aspect, alone or in combination with one or more of the first through sixth aspects, the reporting setting is linked to the DMRS based at least in part on at least one of a layer via which the DMRS is transmitted, a port via which the DMRS is transmitted, a semi-persistent scheduling identifier associated with the DMRS, a control resource set identifier associated with the DMRS, a transmission configuration indicator state associated with the DMRS, or a combination thereof.

In an eighth aspect, alone or in combination with one or more of the first through seventh aspects, the reporting setting is linked to the DMRS based at least in part on a resource setting indicated by the reporting setting, wherein the resource setting identifies a resource on which the DMRS is transmitted.

In a ninth aspect, alone or in combination with one or more of the first through eighth aspects, the measurement report is based at least in part on a reporting setting, and the reporting setting indicates at least one of a maximum number of transmit/receive points (TRPs) associated with the measurement report, a maximum number of reported reference signals associated with the measurement report, a maximum number of reported reference signals per type of reference signal, a maximum number of reported reference signals per layer or per port, or a combination thereof.

In a tenth aspect, alone or in combination with one or more of the first through ninth aspects, the measurement report includes a DMRS resource indicator (DMRSRI).

In an eleventh aspect, alone or in combination with one or more of the first through tenth aspects, the DMRSRI is based at least in part on a quasi-colocated synchronization signal and physical broadcast channel block resource indicator (SSB) or a quasi-colocated channel state information resource indicator.

In a twelfth aspect, alone or in combination with one or more of the first through eleventh aspects, the DMRSRI is based at least in part on one of a time interval relative to a time reference, a layer identifier, a port identifier, an average measurement across two or more layers or ports, or a transmission configuration indicator state, or a combination thereof.

In a thirteenth aspect, alone or in combination with one or more of the first through twelfth aspects, the measurement report indicates an absolute value of each measurement of the set of measurements.

In a fourteenth aspect, alone or in combination with one or more of the first through thirteenth aspects, the measurement report indicates an absolute value for a particular measurement of the set of measurements and one or more differential values relative to the absolute value for one or more remaining measurements of the set of measurements.

In a fifteenth aspect, alone or in combination with one or more of the first through fourteenth aspects, the particular measurement is a strongest measurement of the set of measurements.

In a sixteenth aspect, alone or in combination with one or more of the first through fifteenth aspects, the particular measurement is associated with a quasi-colocation source for the DMRS.

In a seventeenth aspect, alone or in combination with one or more of the first through sixteenth aspects, the measurement report is associated with a first transmit/receive point (TRP) and a second TRP, and the set of measurements indicates one of a best measurement associated with each TRP, of the first TRP and the second TRP, an average measurement associated with the first TRP and an average measurement associated with the second TRP, a combined average measurement associated with the first TRP and the second TRP, or a combination thereof.

In an eighteenth aspect, alone or in combination with one or more of the first through seventeenth aspects, the measurement report is associated with a first DMRS port and a second DMRS port, and the set of measurements indicates one of a best measurement associated with each DMRS port, of the first DMRS port and the second DMRS port, an average measurement associated with the first DMRS port and an average measurement associated with the second DMRS port, a combined average measurement associated with the first DMRS port and the second DMRS port, or a combination thereof.

In a nineteenth aspect, alone or in combination with one or more of the first through eighteenth aspects, process 900 includes transmitting, prior to determining the set of measurements, information indicating a recommended type for the measurement report, and receiving, prior to determining the set of measurements, a reporting setting based at least in part on the recommended type.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
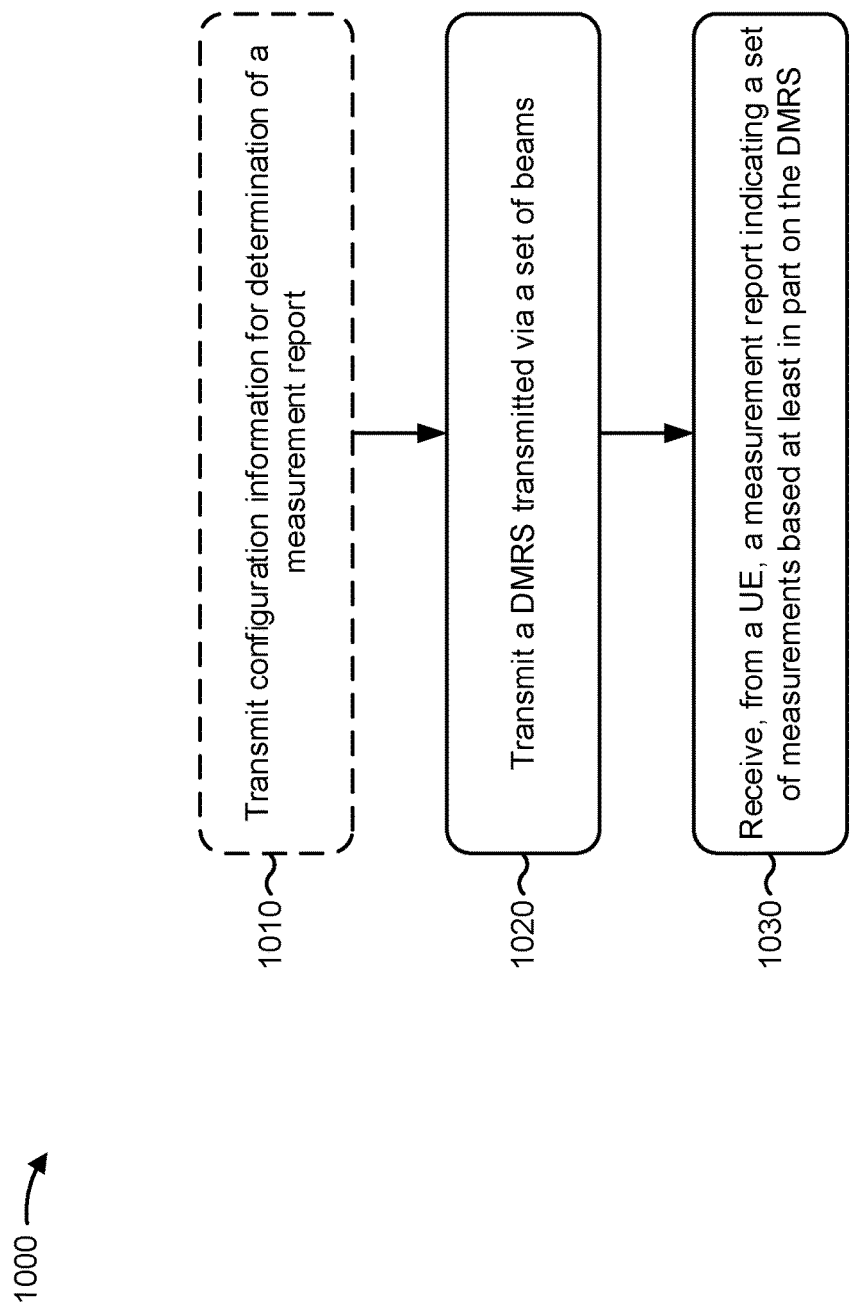

FIG. 10 is a diagram illustrating an example process 1000 performed, for example, by a base station, in accordance with various aspects of the present disclosure. Example process 1000 is an example where the base station (e.g., base station 110) performs operations associated with a measurement report for mixed downlink reference signal reporting. Dashed blocks indicate optional steps.

As shown in FIG. 10, in some aspects, process 1000 may include transmitting configuration information for determination of a measurement report (block 1010). For example, the base station (e.g., using configuration component 1308, depicted in FIG. 13) may transmit configuration information for determination of a measurement report, as described above.

As shown in FIG. 10, in some aspects, process 1000 may include transmitting a DMRS transmitted via a set of beams (block 1020). For example, the base station (e.g., using transmission component 1304, depicted in FIG. 13) may transmit a DMRS transmitted via a set of beams, as described above.

As further shown in FIG. 10, in some aspects, process 1000 may include receiving, from a UE, a measurement report indicating a set of measurements based at least in part on the DMRS (block 1030). For example, the base station (e.g., using reception component 1302, depicted in FIG. 13) may receive, from a UE, a measurement report indicating a set of measurements based at least in part on the DMRS, as described above.

Process 1000 may include additional aspects, such as any single aspect or any combination of aspects described below and/or in connection with one or more other processes described elsewhere herein.

In a first aspect, the measurement report indicates at least one of a measurement based at least in part on a synchronization signal and physical broadcast channel block, a measurement based at least in part on a channel state information reference signal, or a combination thereof.

In a second aspect, alone or in combination with the first aspect, the measurement report is based at least in part on a reporting setting linked to the DMRS transmitted via the set of beams.

In a third aspect, alone or in combination with one or more of the first and second aspects, process 1000 includes configuring the reporting setting.

In a fourth aspect, alone or in combination with one or more of the first through third aspects, the reporting setting indicates at least one of a maximum number of TRPs associated with the measurement report, a maximum number of reported reference signals associated with the measurement report, a maximum number of reported reference signals per type of reference signal, a maximum number of reported reference signals per layer or per port, or a combination thereof.

In a fifth aspect, alone or in combination with one or more of the first through fourth aspects, process 1000 includes transmitting information indicating an aperiodic trigger state indicating the reporting setting, wherein the measurement report is based at least in part on the aperiodic trigger state indicating the reporting setting.

In a sixth aspect, alone or in combination with one or more of the first through fifth aspects, the measurement report is based at least in part on a periodic or semi-persistent trigger state associated with the reporting setting.

In a seventh aspect, alone or in combination with one or more of the first through sixth aspects, the reporting setting is linked to the DMRS transmitted via the set of beams based at least in part on a time interval between the DMRS and a time reference.

In an eighth aspect, alone or in combination with one or more of the first through seventh aspects, the reporting setting is linked to the DMRS based at least in part on the DMRS being directed to the UE.

In a ninth aspect, alone or in combination with one or more of the first through eighth aspects, the reporting setting is linked to the DMRS based at least in part on at least one of a layer via which the DMRS is transmitted, a port via which the DMRS is transmitted, a semi-persistent scheduling identifier associated with the DMRS, a control resource set identifier associated with the DMRS, a transmission configuration indicator state associated with the DMRS, or a combination thereof.

In a tenth aspect, alone or in combination with one or more of the first through ninth aspects, the reporting setting is linked to the DMRS based at least in part on a resource setting indicated by the reporting setting, wherein the resource setting identifies a resource on which the DMRS is transmitted.

In an eleventh aspect, alone or in combination with one or more of the first through tenth aspects, the measurement report includes a DMRS resource indicator (DMRSRI).

In a twelfth aspect, alone or in combination with one or more of the first through eleventh aspects, the DMRSRI is based at least in part on a quasi-colocated synchronization signal and physical broadcast channel block (SSB) resource indicator or a quasi-colocated channel state information resource indicator.

In a thirteenth aspect, alone or in combination with one or more of the first through twelfth aspects, the DMRSRI is based at least in part on one of a time interval relative to a time reference, a layer identifier, a port identifier, an average measurement across two or more layers or ports, a transmission configuration indicator state, or a combination thereof.

In a fourteenth aspect, alone or in combination with one or more of the first through thirteenth aspects, the measurement report indicates an absolute value of each measurement of the set of measurements.

In a fifteenth aspect, alone or in combination with one or more of the first through fourteenth aspects, the measurement report indicates an absolute value for a particular measurement of the set of measurements and one or more differential values relative to the absolute value for one or more remaining measurements of the set of measurements.

In a sixteenth aspect, alone or in combination with one or more of the first through fifteenth aspects, the particular measurement is a strongest measurement of the set of measurements.

In a seventeenth aspect, alone or in combination with one or more of the first through sixteenth aspects, the particular measurement is associated with a quasi-colocation source for the DMRS.

In an eighteenth aspect, alone or in combination with one or more of the first through seventeenth aspects, the measurement report is associated with a first transmit/receive point (TRP) and a second TRP, and the set of measurements indicates one of a best measurement associated with each TRP, of the first TRP and the second TRP, an average measurement associated with the first TRP and an average measurement associated with the second TRP, a combined average measurement associated with the first TRP and the second TRP, or a combination thereof.

In a nineteenth aspect, alone or in combination with one or more of the first through eighteenth aspects, the measurement report is associated with a first DMRS port and a second DMRS port, and the set of measurements indicates one of a best measurement associated with each DMRS port, of the first DMRS port and the second DMRS port, an average measurement associated with the first DMRS port and an average measurement associated with the second DMRS port, a combined average measurement associated with the first DMRS port and the second DMRS port, or a combination thereof.

In a twentieth aspect, alone or in combination with one or more of the first through nineteenth aspects, process 1000 includes receiving, prior to determining the set of measurements, information indicating a recommended type for the measurement report, and configuring, for the UE, a reporting setting based at least in part on the recommended type.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
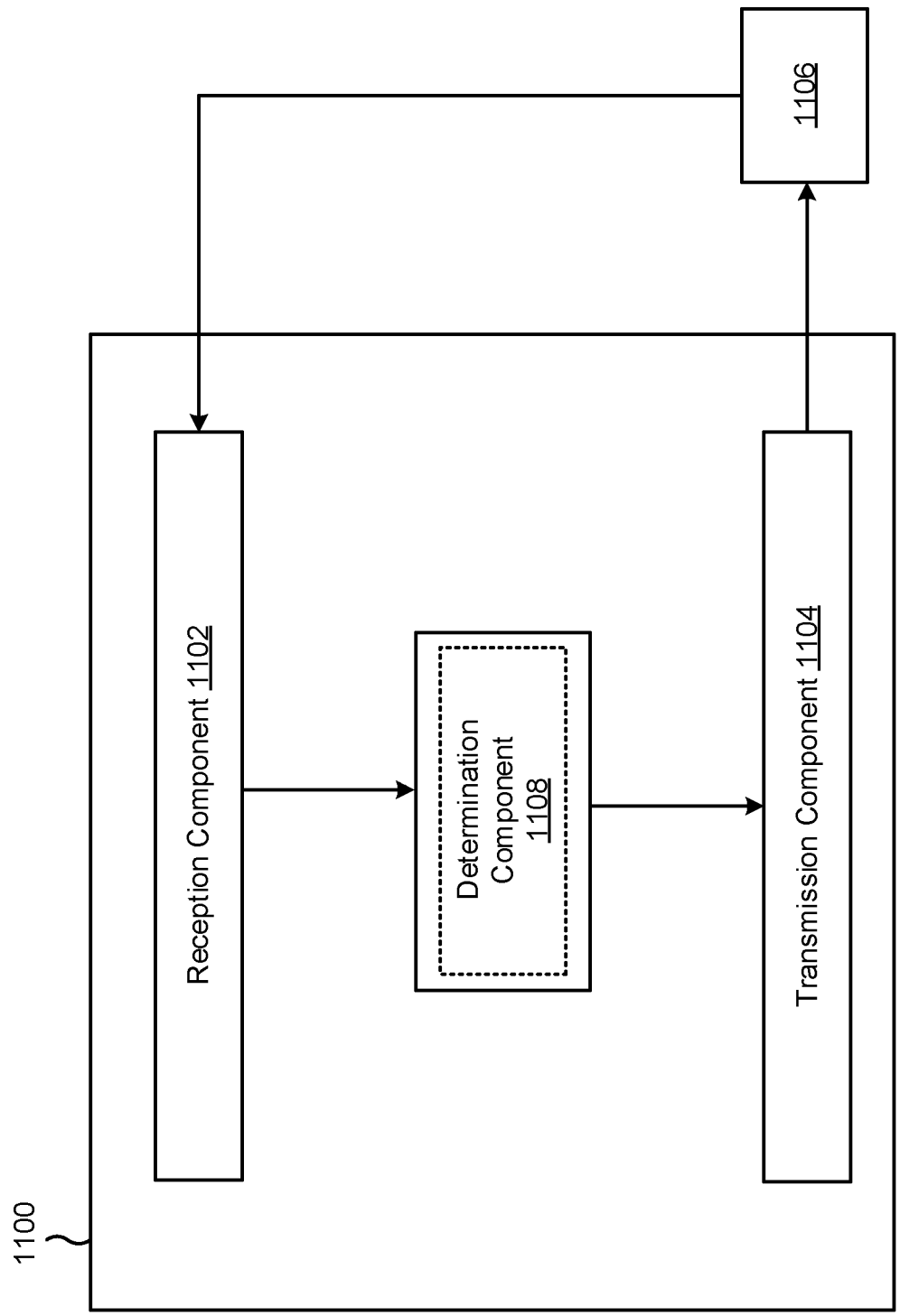
FIG. 11 is a block diagram of an example apparatus for wireless communication, in accordance with various aspects of the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 3-8. Additionally or alternatively, the apparatus 1100 may be configured to perform one or more processes described herein, such as process 900 of FIG. 9. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be collocated with the reception component 1102 in a transceiver.

The determination component 1108 may determine a set of measurements based at least in part on a DMRS transmitted via a set of beams. In some aspects, the determination component 1108 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 1104 may transmit a measurement report indicating the set of measurements based at least in part on the DMRS.

The transmission component 1104 may transmit, prior to determining the set of measurements, information indicating a recommended type for the measurement report.

The reception component 1102 may receive, prior to determining the set of measurements, a reporting setting based at least in part on the recommended type.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
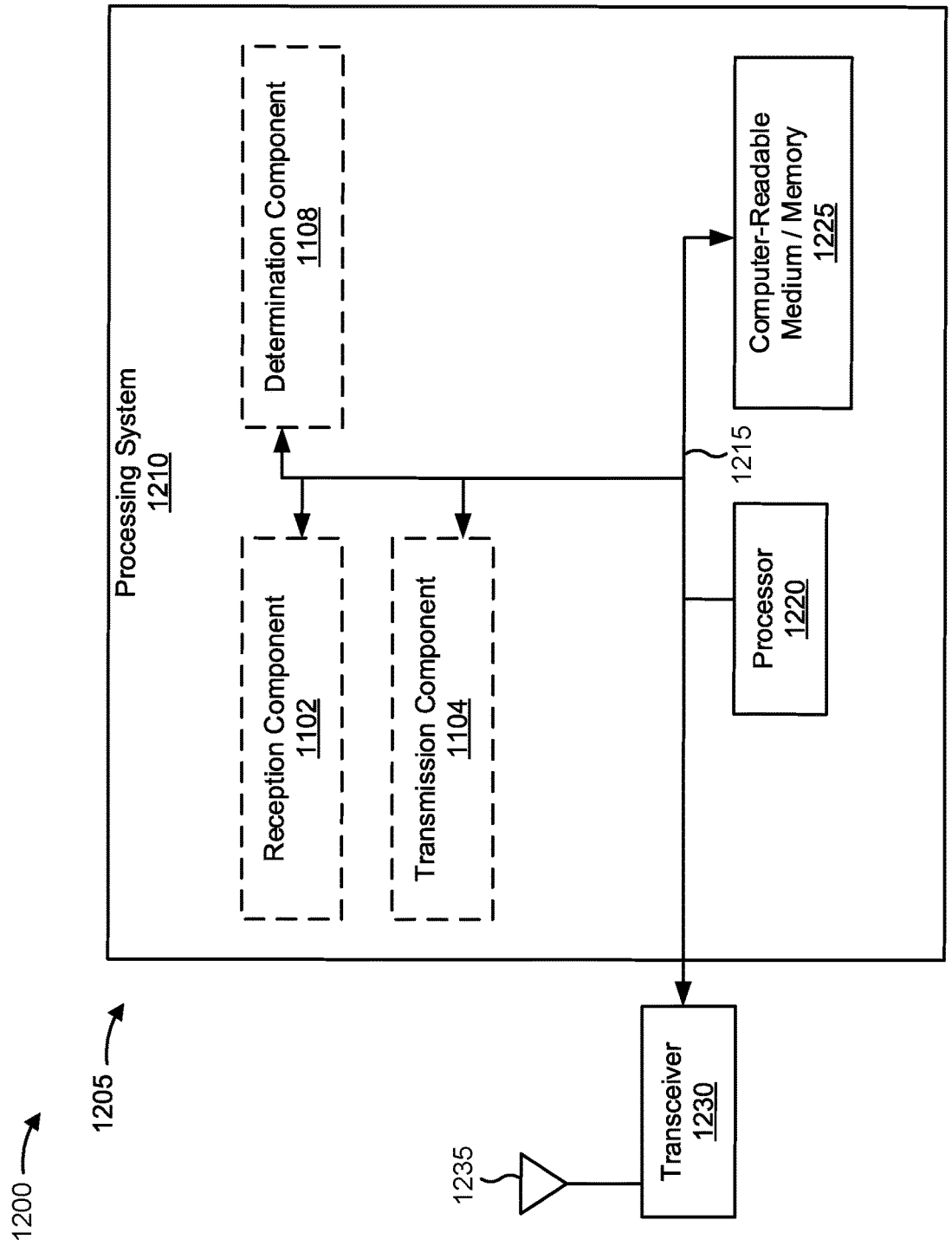
FIG. 12 is a diagram illustrating an example of a hardware implementation for an apparatus employing a processing system, in accordance with various aspects of the present disclosure.

FIG. 12 is a diagram illustrating an example 1200 of a hardware implementation for an apparatus 1205 employing a processing system 1210, in accordance with various aspects of the present disclosure. The apparatus 1205 may be a UE.

The processing system 1210 may be implemented with a bus architecture, represented generally by the bus 1215. The bus 1215 may include any number of interconnecting buses and bridges depending on the specific application of the processing system 1210 and the overall design constraints. The bus 1215 links together various circuits including one or more processors and/or hardware components, represented by the processor 1220, the illustrated components, and the computer-readable medium/memory 1225. The bus 1215 may also link various other circuits, such as timing sources, peripherals, voltage regulators, power management circuits, and/or the like.

The processing system 1210 may be coupled to a transceiver 1230. The transceiver 1230 is coupled to one or more antennas 1235. The transceiver 1230 provides a means for communicating with various other apparatuses over a transmission medium. The transceiver 1230 receives a signal from the one or more antennas 1235, extracts information from the received signal, and provides the extracted information to the processing system 1210, specifically the reception component 1102. In addition, the transceiver 1230 receives information from the processing system 1210, specifically the transmission component 1104, and generates a signal to be applied to the one or more antennas 1235 based at least in part on the received information.

The processing system 1210 includes a processor 1220 coupled to a computer-readable medium/memory 1225. The processor 1220 is responsible for general processing, including the execution of software stored on the computer-readable medium/memory 1225. The software, when executed by the processor 1220, causes the processing system 1210 to perform the various functions described herein for any particular apparatus. The computer-readable medium/memory 1225 may also be used for storing data that is manipulated by the processor 1220 when executing software. The processing system further includes at least one of the illustrated components. The components may be software modules running in the processor 1220, resident/stored in the computer readable medium/memory 1225, one or more hardware modules coupled to the processor 1220, or some combination thereof.

In some aspects, the processing system 1210 may be a component of the UE 120 and may include the memory 282 and/or at least one of the TX MIMO processor 266, the RX processor 258, and/or the controller/processor 280. In some aspects, the apparatus 1205 for wireless communication provides means for determining a set of measurements based at least in part on a DMRS transmitted via a set of beams; and means for transmitting a measurement report indicating the set of measurements based at least in part on the DMRS. The aforementioned means may be one or more of the aforementioned components of the apparatus 1100 and/or the processing system 1210 of the apparatus 1205 configured to perform the functions recited by the aforementioned means. As described elsewhere herein, the processing system 1210 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 12 is provided as an example. Other examples may differ from what is described in connection with FIG. 12.

Figure 13:
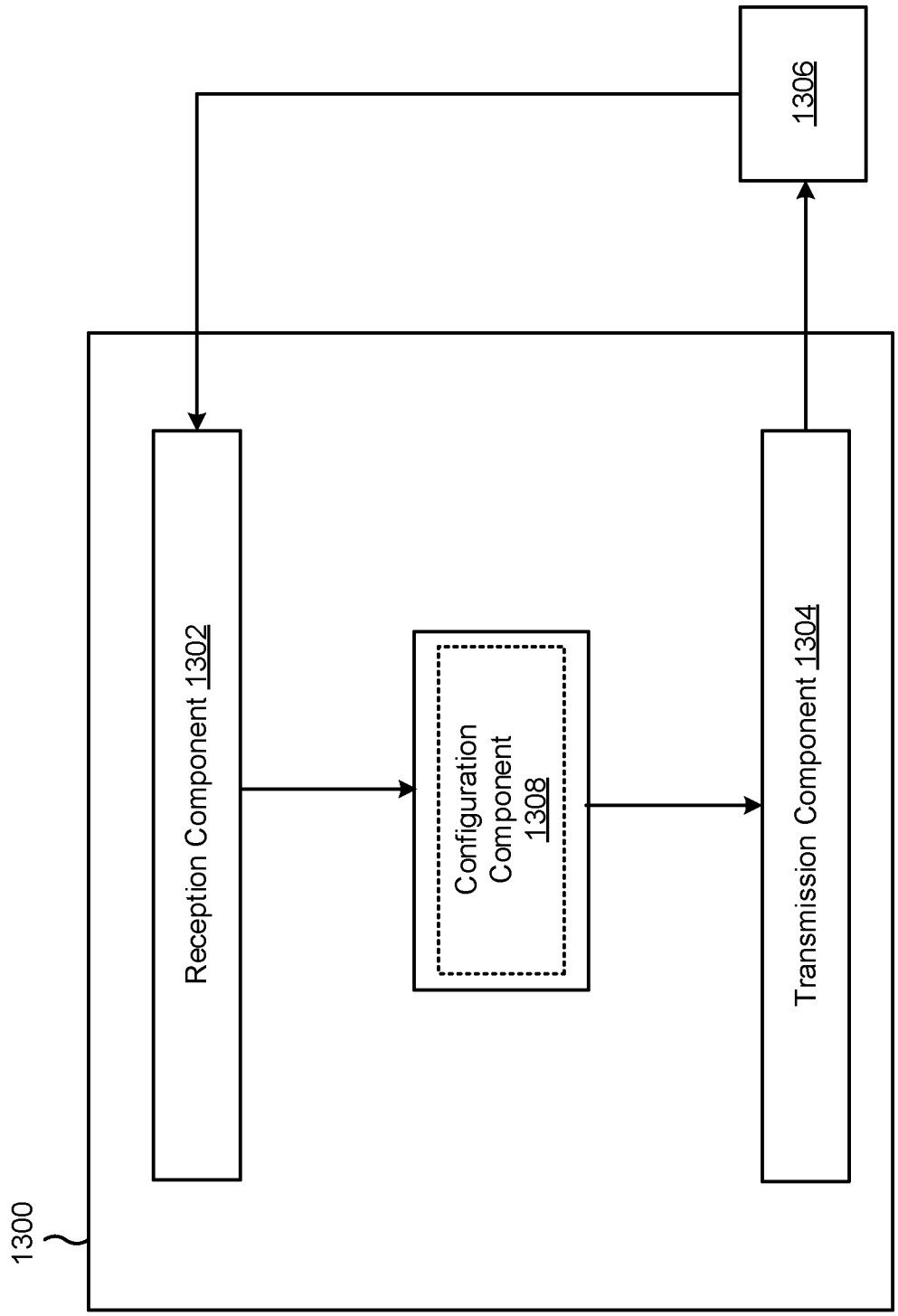
FIG. 13 is a block diagram of an example apparatus for wireless communication, in accordance with various aspects of the present disclosure.

FIG. 13 is a block diagram of an example apparatus 1300 for wireless communication, in accordance with various aspects of the present disclosure. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a configuration component 1308, among other examples.

In some aspects, the apparatus 1300 may be configured to perform one or more operations described herein in connection with FIGS. 3-8. Additionally or alternatively, the apparatus 1300 may be configured to perform one or more processes described herein, such as process 1000 of FIG. 10. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be collocated with the reception component 1302 in a transceiver.

The transmission component 1304 may transmit a DMRS transmitted via a set of beams. The reception component 1302 may receive, from a UE, a measurement report indicating a set of measurements based at least in part on the DMRS.

The configuration component 1308 may configure the reporting setting. In some aspects, the configuration component 1308 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The transmission component 1304 may transmit information indicating an aperiodic trigger state indicating the reporting setting, wherein the measurement report is based at least in part on the aperiodic trigger state indicating the reporting setting.

The reception component 1302 may receive, prior to determining the set of measurements, information indicating a recommended type for the measurement report.

The configuration component 1308 may configure, for the UE, a reporting setting based at least in part on the recommended type.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
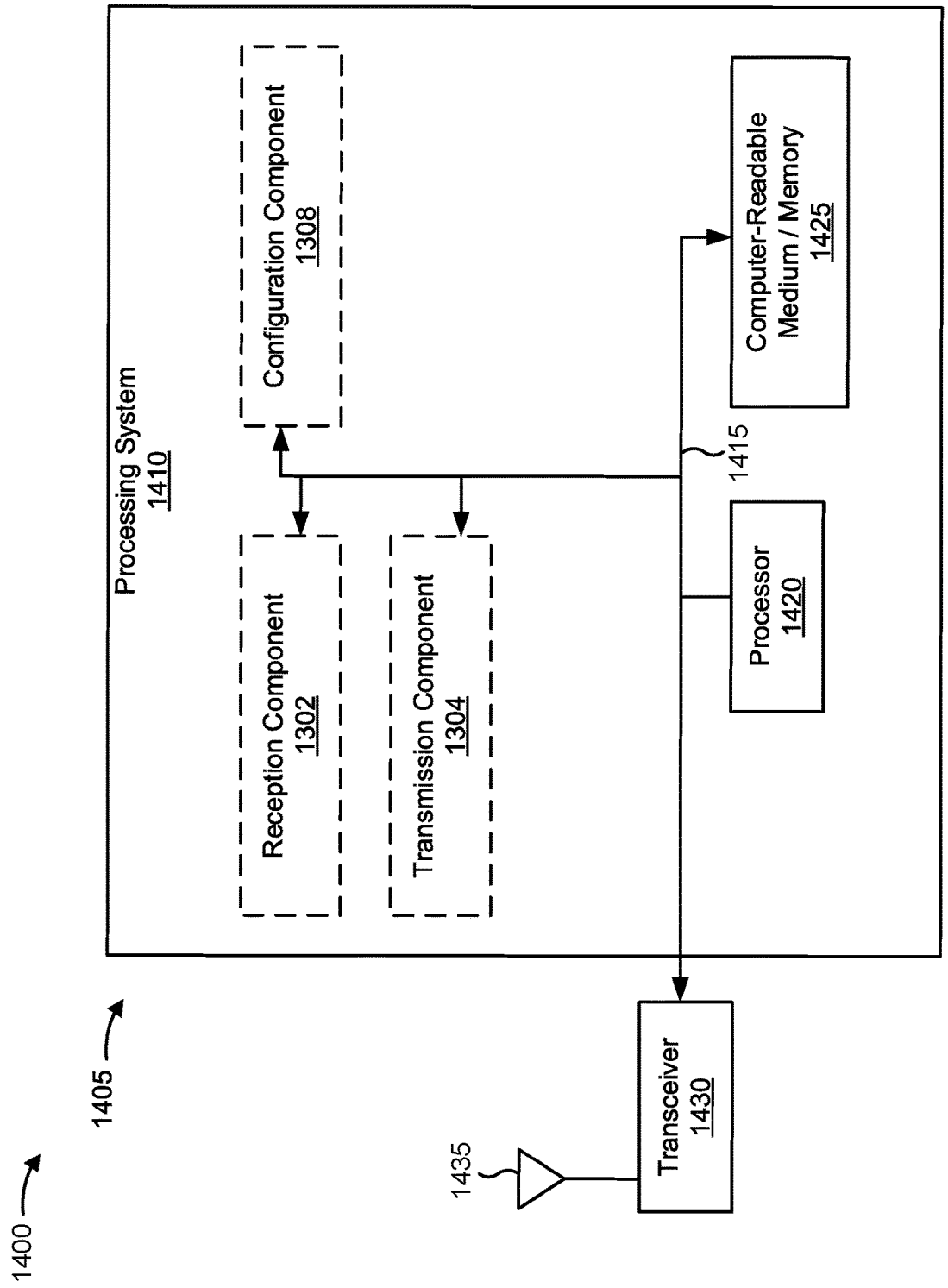
FIG. 14 is a diagram illustrating an example of a hardware implementation for an apparatus employing a processing system, in accordance with various aspects of the present disclosure.

FIG. 14 is a diagram illustrating an example 1400 of a hardware implementation for an apparatus 1405 employing a processing system 1410, in accordance with various aspects of the present disclosure. The apparatus 1405 may be a base station.

The processing system 1410 may be implemented with a bus architecture, represented generally by the bus 1415. The bus 1415 may include any number of interconnecting buses and bridges depending on the specific application of the processing system 1410 and the overall design constraints. The bus 1415 links together various circuits including one or more processors and/or hardware components, represented by the processor 1420, the illustrated components, and the computer-readable medium/memory 1425. The bus 1415 may also link various other circuits, such as timing sources, peripherals, voltage regulators, power management circuits, and/or the like.

The processing system 1410 may be coupled to a transceiver 1430. The transceiver 1430 is coupled to one or more antennas 1435. The transceiver 1430 provides a means for communicating with various other apparatuses over a transmission medium. The transceiver 1430 receives a signal from the one or more antennas 1435, extracts information from the received signal, and provides the extracted information to the processing system 1410, specifically the reception component 1302. In addition, the transceiver 1430 receives information from the processing system 1410, specifically the transmission component 1304, and generates a signal to be applied to the one or more antennas 1435 based at least in part on the received information.

The processing system 1410 includes a processor 1420 coupled to a computer-readable medium/memory 1425. The processor 1420 is responsible for general processing, including the execution of software stored on the computer-readable medium/memory 1425. The software, when executed by the processor 1420, causes the processing system 1410 to perform the various functions described herein for any particular apparatus. The computer-readable medium/memory 1425 may also be used for storing data that is manipulated by the processor 1420 when executing software. The processing system further includes at least one of the illustrated components. The components may be software modules running in the processor 1420, resident/stored in the computer readable medium/memory 1425, one or more hardware modules coupled to the processor 1420, or some combination thereof.

In some aspects, the processing system 1410 may be a component of the base station 110 and may include the memory 242 and/or at least one of the TX MIMO processor 230, the RX processor 238, and/or the controller/processor 240. In some aspects, the apparatus 1405 for wireless communication provides means for transmitting a DMRS transmitted via a set of beams; and means for receiving, from a UE, a measurement report indicating a set of measurements based at least in part on the DMRS. The aforementioned means may be one or more of the aforementioned components of the apparatus 1300 and/or the processing system 1410 of the apparatus 1405 configured to perform the functions recited by the aforementioned means. As described elsewhere herein, the processing system 1410 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 14 is provided as an example. Other examples may differ from what is described in connection with FIG. 14.

Figure 15:
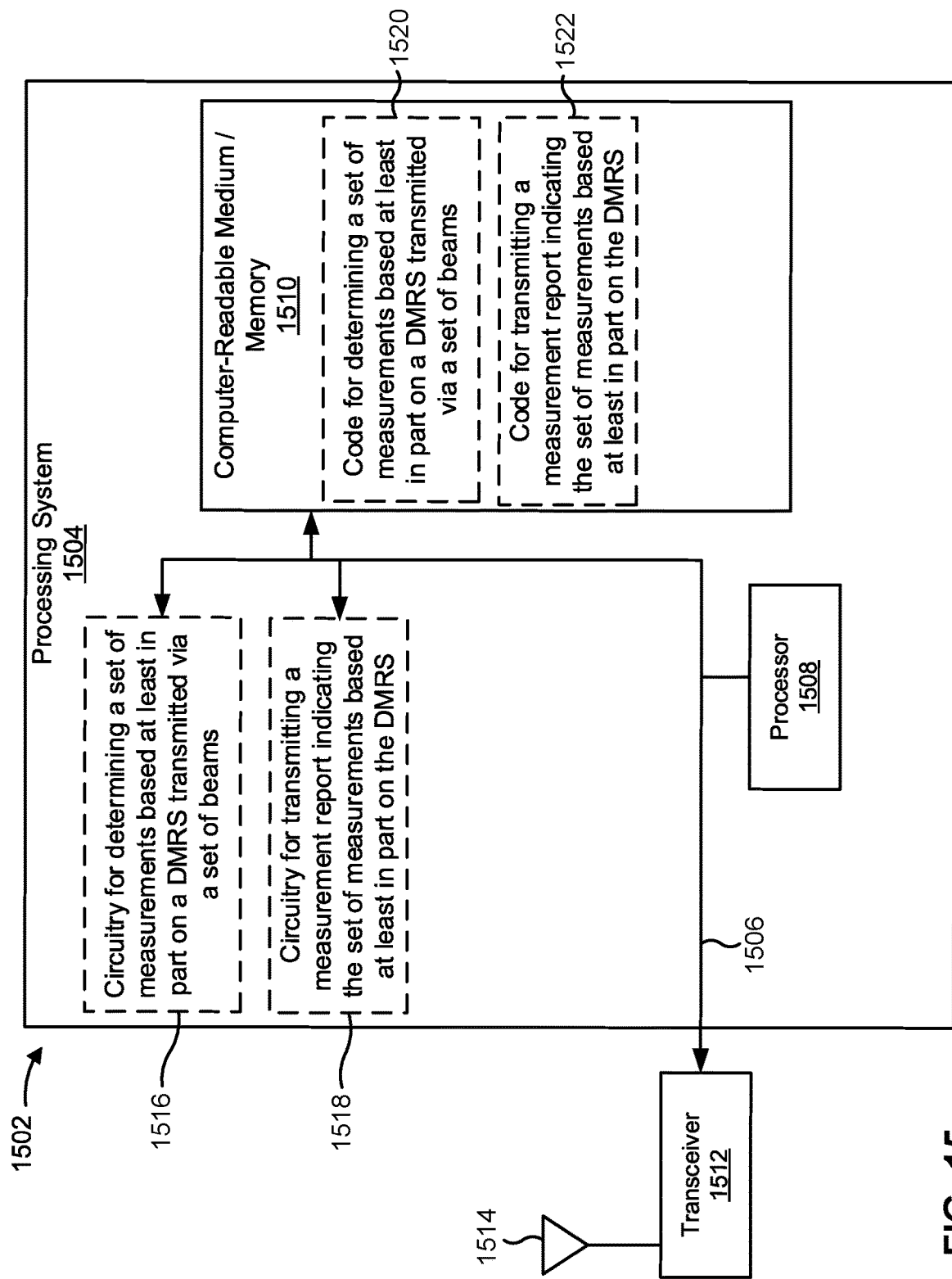
FIG. 15 is a diagram illustrating an example of an implementation of code and circuitry for an apparatus for wireless communication, in accordance with various aspects of the present disclosure.

FIG. 15 is a diagram illustrating an example 1500 of an implementation of code and circuitry for an apparatus 1502 for wireless communication, in accordance with various aspects of the present disclosure. The apparatus 1502 may be, be similar to, include, or be included in the apparatus 1205 shown in FIG. 12 and/or the apparatus 1100 shown in FIG. 11. The apparatus 1502 may include a processing system 1504, which may include a bus 1506 coupling one or more components such as, for example, a processor 1508, computer-readable medium/memory 1510, a transceiver 1512, and/or the like. As shown, the transceiver 1512 may be coupled to one or more antenna 1514.

As further shown in FIG. 15, the apparatus 1502 may include circuitry for determining a set of measurements based at least in part on a DMRS transmitted via a set of beams (circuitry 1516). For example, the apparatus 1502 may include circuitry 1516 to enable the apparatus 1502 to determine a set of measurements based at least in part on a DMRS transmitted via a set of beams.

As further shown in FIG. 15, the apparatus 1502 may include circuitry for transmitting a measurement report indicating the set of measurements based at least in part on the DMRS (circuitry 1518). For example, the apparatus 1502 may include circuitry 1518 to enable the apparatus 1502 to transmit a measurement report indicating the set of measurements based at least in part on the DMRS.

As further shown in FIG. 15, the apparatus 1502 may include, stored in computer-readable medium 1510, code for determining a set of measurements based at least in part on a DMRS transmitted via a set of beams (code 1520). For example, the apparatus 1502 may include code 1520 that, when executed by the processor 1508, may cause the transceiver 1512 to determine a set of measurements based at least in part on a DMRS transmitted via a set of beams.

As further shown in FIG. 15, the apparatus 1502 may include, stored in computer-readable medium 1510, code for transmitting a measurement report indicating the set of measurements based at least in part on the DMRS (code 1522). For example, the apparatus 1502 may include code 1522 that, when executed by the processor 1508, may cause the processor 1508 to transmit a measurement report indicating the set of measurements based at least in part on the DMRS.

FIG. 15 is provided as an example. Other examples may differ from what is described in connection with FIG. 15.

Figure 16:
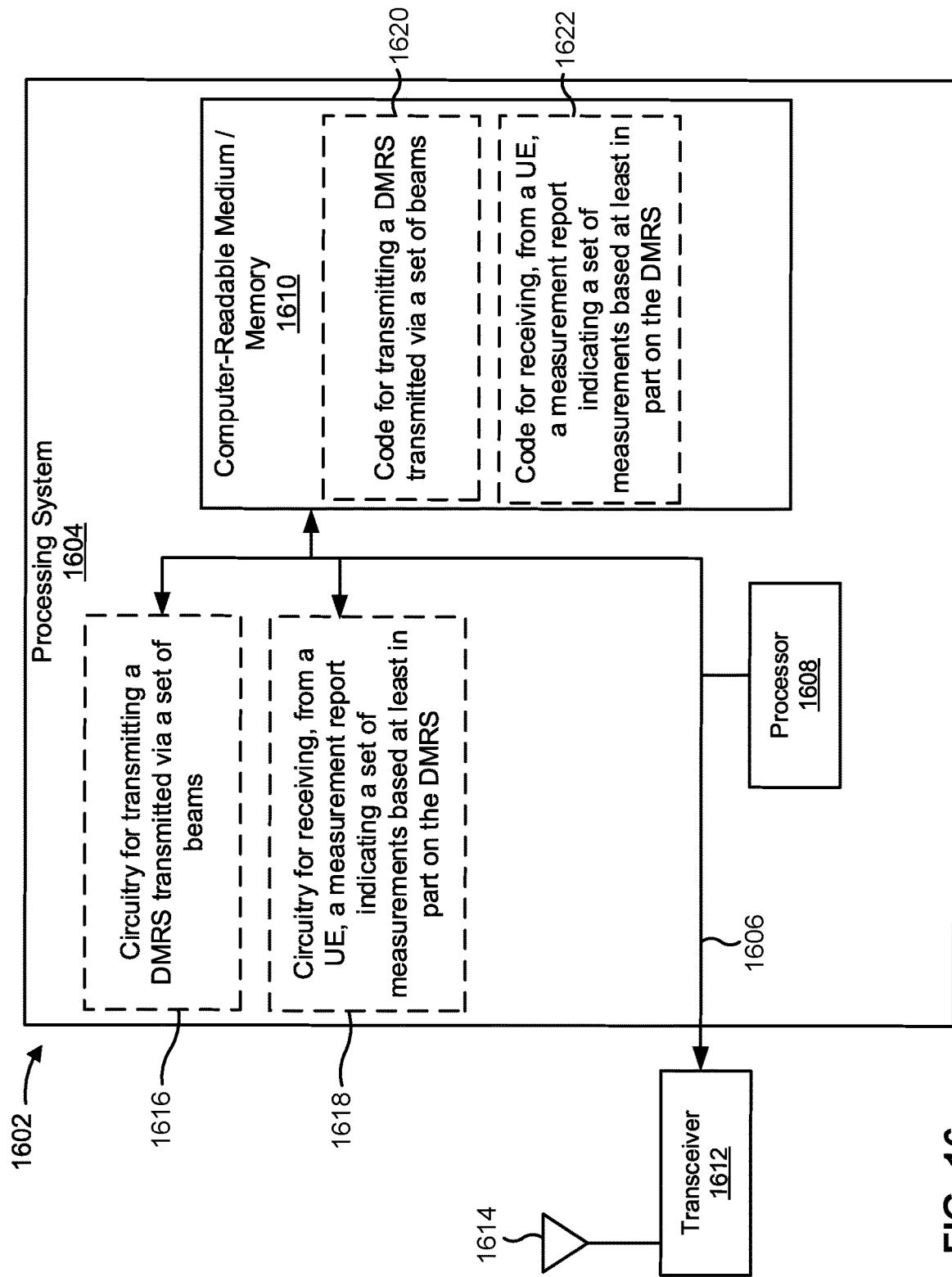
FIG. 16 is a diagram illustrating an example of an implementation of code and circuitry for an apparatus for wireless communication, in accordance with various aspects of the present disclosure.

FIG. 16 is a diagram illustrating an example 1600 of an implementation of code and circuitry for an apparatus 1602 for wireless communication. The apparatus 1602 may be, be similar to, include, or be included in the apparatus 1405 shown in FIG. 14 and/or the apparatus 1300 shown in FIG. 13. The apparatus 1602 may include a processing system 1604, which may include a bus 1606 coupling one or more components such as, for example, a processor 1608, computer-readable medium/memory 1610, a transceiver 1612, and/or the like. As shown, the transceiver 1612 may be coupled to one or more antenna 1614.

As further shown in FIG. 16, the apparatus 1602 may include circuitry for transmitting a DMRS transmitted via a set of beams (circuitry 1616). For example, the apparatus 1602 may include circuitry 1616 to enable the apparatus 1602 to transmit a DMRS transmitted via a set of beams.

As further shown in FIG. 16, the apparatus 1602 may include circuitry for receiving, from a UE, a measurement report indicating a set of measurements based at least in part on the DMRS (circuitry 1618). For example, the apparatus 1602 may include circuitry 1618 to enable the apparatus 1602 to receive, from a UE, a measurement report indicating a set of measurements based at least in part on the DMRS.

As further shown in FIG. 16, the apparatus 1602 may include, stored in computer-readable medium 1610, code for transmitting a DMRS transmitted via a set of beams (code 1620). For example, the apparatus 1602 may include code 1620 that, when executed by the processor 1608, may cause the transceiver 1612 to transmit a DMRS transmitted via a set of beams.

As further shown in FIG. 16, the apparatus 1602 may include, stored in computer-readable medium 1610, code for receiving, from a UE, a measurement report indicating a set of measurements based at least in part on the DMRS (code 1622). For example, the apparatus 1602 may include code 1622 that, when executed by the processor 1608, may cause the processor 1608 to receive, from a UE, a measurement report indicating a set of measurements based at least in part on the DMRS.

FIG. 16 is provided as an example. Other examples may differ from what is described in connection with FIG. 16.

The following provides an overview of some Aspects of the present disclosure:

Aspect 1: A method of wireless communication performed by a user equipment (UE), comprising: receiving configuration information for a set of measurements to be determined based at least in part on a demodulation reference signal (DMRS) transmitted via a set of beams; and transmitting a measurement report indicating the set of measurements based at least in part on the DMRS.

Aspect 2: The method of Aspect 1, wherein the measurement report indicates at least one of: a measurement based at least in part on a synchronization signal and physical broadcast channel block, or a measurement based at least in part on a channel state information reference signal.

Aspect 3: The method of any of Aspects 1-2, wherein the measurement report is based at least in part on a reporting setting linked to the DMRS transmitted via the set of beams.

Aspect 4: The method of Aspect 3, wherein the measurement report is based at least in part on an aperiodic trigger state indicating the reporting setting.

Aspect 5: The method of Aspect 3, wherein the measurement report is based at least in part on a periodic or semi-persistent trigger state associated with the reporting setting.

Aspect 6: The method of Aspect 3, wherein the reporting setting is linked to the DMRS transmitted via the set of beams based at least in part on a time interval between the DMRS and a time reference.

Aspect 7: The method of Aspect 3, wherein the reporting setting is linked to the DMRS based at least in part on the DMRS being directed to the UE.

Aspect 8: The method of Aspect 3, wherein the reporting setting is linked to the DMRS based at least in part on at least one of: a layer via which the DMRS is transmitted, a port via which the DMRS is transmitted, a semi-persistent scheduling identifier associated with the DMRS, a control resource set identifier associated with the DMRS, a transmission configuration indicator state associated with the DMRS, or a combination thereof.

Aspect 9: The method of Aspect 3, wherein the reporting setting is linked to the DMRS based at least in part on a resource setting indicated by the reporting setting, wherein the resource setting identifies a resource on which the DMRS is transmitted.

Aspect 10: The method of any of Aspects 1-9, wherein the measurement report is based at least in part on a reporting setting, and wherein the reporting setting indicates at least one of: a maximum number of transmit/receive points (TRPs) associated with the measurement report, a maximum number of reported reference signals associated with the measurement report, a maximum number of reported reference signals per type of reference signal, a maximum number of reported reference signals per layer or per port, or a combination thereof.

Aspect 11: The method of any of Aspects 1-10, wherein the measurement report includes a DMRS resource indicator (DMRSRI).

Aspect 12: The method of Aspect 11, wherein the DMRSRI is based at least in part on a quasi-colocated synchronization signal and physical broadcast channel block resource indicator (SSB) or a quasi-colocated channel state information resource indicator.

Aspect 13: The method of Aspect 11, wherein the DMRSRI is based at least in part on one of: a time interval relative to a time reference, a layer identifier, a port identifier, an average measurement across two or more layers or ports, or a transmission configuration indicator state, or a combination thereof.

Aspect 14: The method of any of Aspects 1-13, wherein the measurement report indicates an absolute value of each measurement of the set of measurements.

Aspect 15: The method of any of Aspects 1-14, wherein the measurement report indicates an absolute value for a particular measurement of the set of measurements and one or more differential values relative to the absolute value for one or more remaining measurements of the set of measurements.

Aspect 16: The method of Aspect 15, wherein the particular measurement is a strongest measurement of the set of measurements.

Aspect 17: The method of Aspect 15, wherein the particular measurement is associated with a quasi-colocation source for the DMRS.

Aspect 18: The method of any of Aspects 1-17, wherein the measurement report is associated with a first transmit/receive point (TRP) and a second TRP, and wherein the set of measurements indicates one of: a best measurement associated with each TRP, of the first TRP and the second TRP, an average measurement associated with the first TRP and an average measurement associated with the second TRP, a combined average measurement associated with the first TRP and the second TRP, or a combination thereof.

Aspect 19: The method of any of Aspects 1-18, wherein the measurement report is associated with a first DMRS port and a second DMRS port, and wherein the set of measurements indicates one of: a best measurement associated with each DMRS port, of the first DMRS port and the second DMRS port, an average measurement associated with the first DMRS port and an average measurement associated with the second DMRS port, a combined average measurement associated with the first DMRS port and the second DMRS port, or a combination thereof.

Aspect 20: The method of any of Aspects 1-19, further comprising: transmitting, prior to determining the set of measurements, information indicating a recommended type for the measurement report; and receiving, prior to determining the set of measurements, a reporting setting based at least in part on the recommended type.

Aspect 21: A method of wireless communication performed by a base station, comprising: transmitting a demodulation reference signal (DMRS) transmitted via a set of beams; and receiving, from a user equipment (UE), a measurement report indicating a set of measurements based at least in part on the DMRS.

Aspect 22: The method of Aspect 21, wherein the measurement report indicates at least one of: a measurement based at least in part on a synchronization signal and physical broadcast channel block, a measurement based at least in part on a channel state information reference signal, or a combination thereof.

Aspect 23: The method of any of Aspects 21-22, wherein the measurement report is based at least in part on a reporting setting linked to the DMRS transmitted via the set of beams.

Aspect 24: The method of Aspect 23, further comprising: configuring the reporting setting.

Aspect 25: The method of Aspect 24, wherein the reporting setting indicates at least one of: a maximum number of transmit/receive points (TRPs) associated with the measurement report, a maximum number of reported reference signals associated with the measurement report, a maximum number of reported reference signals per type of reference signal, a maximum number of reported reference signals per layer or per port, or a combination thereof.

Aspect 26: The method of Aspect 23, further comprising: transmitting information indicating an aperiodic trigger state indicating the reporting setting, wherein the measurement report is based at least in part on the aperiodic trigger state indicating the reporting setting.

Aspect 27: The method of Aspect 23, wherein the measurement report is based at least in part on a periodic or semi-persistent trigger state associated with the reporting setting.

Aspect 28: The method of Aspect 23, wherein the reporting setting is linked to the DMRS transmitted via the set of beams based at least in part on a time interval between the DMRS and a time reference.

Aspect 29: The method of Aspect 23, wherein the reporting setting is linked to the DMRS based at least in part on the DMRS being directed to the UE.

Aspect 30: The method of Aspect 23, wherein the reporting setting is linked to the DMRS based at least in part on at least one of: a layer via which the DMRS is transmitted, a port via which the DMRS is transmitted, a semi-persistent scheduling identifier associated with the DMRS, a control resource set identifier associated with the DMRS, a transmission configuration indicator state associated with the DMRS, or a combination thereof.

Aspect 31: The method of Aspect 23, wherein the reporting setting is linked to the DMRS based at least in part on a resource setting indicated by the reporting setting, wherein the resource setting identifies a resource on which the DMRS is transmitted.

Aspect 32: The method of any of Aspects 21-31, wherein the measurement report includes a DMRS resource indicator (DMRSRI).

Aspect 33: The method of Aspect 32, wherein the DMRSRI is based at least in part on a quasi-colocated synchronization signal and physical broadcast channel block (SSB) resource indicator or a quasi-colocated channel state information resource indicator.

Aspect 34: The method of Aspect 32, wherein the DMRSRI is based at least in part on one of: a time interval relative to a time reference, a layer identifier, a port identifier, an average measurement across two or more layers or ports, a transmission configuration indicator state, or a combination thereof.

Aspect 35: The method of any of Aspects 21-34, wherein the measurement report indicates an absolute value of each measurement of the set of measurements.

Aspect 36: The method of any of Aspects 21-35, wherein the measurement report indicates an absolute value for a particular measurement of the set of measurements and one or more differential values relative to the absolute value for one or more remaining measurements of the set of measurements.

Aspect 37: The method of Aspect 36, wherein the particular measurement is a strongest measurement of the set of measurements.

Aspect 38: The method of Aspect 36, wherein the particular measurement is associated with a quasi-colocation source for the DMRS.

Aspect 39: The method of any of Aspects 21-38, wherein the measurement report is associated with a first transmit/receive point (TRP) and a second TRP, and wherein the set of measurements indicates one of: a best measurement associated with each TRP, of the first TRP and the second TRP, an average measurement associated with the first TRP and an average measurement associated with the second TRP, a combined average measurement associated with the first TRP and the second TRP, or a combination thereof.

Aspect 40: The method of any of Aspects 21-39, wherein the measurement report is associated with a first DMRS port and a second DMRS port, and wherein the set of measurements indicates one of: a best measurement associated with each DMRS port, of the first DMRS port and the second DMRS port, an average measurement associated with the first DMRS port and an average measurement associated with the second DMRS port, a combined average measurement associated with the first DMRS port and the second DMRS port, or a combination thereof.

Aspect 41: The method of any of Aspects 21-40, further comprising: receiving, prior to determining the set of measurements, information indicating a recommended type for the measurement report; and configuring, for the UE, a reporting setting based at least in part on the recommended type.

Aspect 42: An apparatus for wireless communication at a device, comprising a processor; memory coupled with the processor; and instructions stored in the memory and executable by the processor to cause the apparatus to perform the method of one or more of Aspects 1-41.

Aspect 43: A device for wireless communication, comprising a memory and one or more processors coupled to the memory, the one or more processors configured to perform the method of one or more of Aspects 1-41.

Aspect 44: An apparatus for wireless communication, comprising at least one means for performing the method of one or more of Aspects 1-41.

Aspect 45: A non-transitory computer-readable medium storing code for wireless communication, the code comprising instructions executable by a processor to perform the method of one or more of Aspects 1-41.

Aspect 46: A non-transitory computer-readable medium storing a set of instructions for wireless communication, the set of instructions comprising one or more instructions that, when executed by one or more processors of a device, cause the device to perform the method of one or more of Aspects 1-41.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories, the one or more processors individually or collectively configured to:
      receive configuration information for a set of measurements to be determined based at least in part on a demodulation reference signal (DMRS) transmitted via a set of beams,
         wherein the configuration information indicates a number N and a rule,
         wherein the rule indicates that a measurement report is to be generated based on DMRS symbols included in the number N slots or mini-slots occurring before a time reference and/or after the time reference, and
         wherein the measurement report indicates the set of measurements; and
      transmit the measurement report.

2. The UE of claim 1, wherein the measurement report indicates at least one of:
   a measurement based at least in part on a synchronization signal and physical broadcast channel block, or
   a measurement based at least in part on a channel state information reference signal.

3. The UE of claim 1, wherein the configuration information includes a reporting setting linked to the DMRS transmitted via the set of beams.

4. The UE of claim 3, wherein the measurement report is based at least in part on an aperiodic trigger state indicating the reporting setting.

5. The UE of claim 3, wherein the measurement report is based at least in part on a periodic or semi-persistent trigger state associated with the reporting setting.

6. The UE of claim 3, wherein the reporting setting is linked to the DMRS transmitted via the set of beams based at least in part on a time interval between the DMRS and the time reference.

7. The UE of claim 3, wherein the reporting setting is linked to the DMRS based at least in part on the DMRS being directed to the UE.

8. The UE of claim 3, wherein the reporting setting is linked to the DMRS based at least in part on:
   a layer via which the DMRS is transmitted,
   a port via which the DMRS is transmitted,
   a semi-persistent scheduling identifier associated with the DMRS,
   a control resource set identifier associated with the DMRS, and/or
   a transmission configuration indicator state associated with the DMRS.

9. The UE of claim 3, wherein the reporting setting is linked to the DMRS based at least in part on a resource setting indicated by the reporting setting,
   wherein the resource setting identifies a resource on which the DMRS is transmitted.

10. The UE of claim 1, wherein the measurement report is based at least in part on a reporting setting, and wherein the reporting setting indicates at least one of:
    a maximum number of transmit/receive points (TRPs) associated with the measurement report,
    a maximum number of reported reference signals associated with the measurement report,
    a maximum number of reported reference signals per type of reference signal, and/or a maximum number of reported reference signals per layer or per port.

11. The UE of claim 1, wherein the measurement report includes a DMRS resource indicator (DMRSRI).

12. The UE of claim 11, wherein the DMRSRI is based at least in part on a quasi-colocated synchronization signal and physical broadcast channel block resource indicator (SSB) or a quasi-colocated channel state information resource indicator.

13. The UE of claim 11, wherein the DMRSRI is based at least in part on:
  a time interval relative to a time reference,
  a layer identifier,
  a port identifier,
  an average measurement across two or more layers or ports, and/or
  a transmission configuration indicator state.

14. The UE of claim 1, wherein the measurement report indicates an absolute value of each measurement of the set of measurements.

15. The UE of claim 1, wherein the measurement report indicates an absolute value for a particular measurement of the set of measurements and one or more differential values relative to the absolute value for one or more remaining measurements of the set of measurements.

16. The UE of claim 15, wherein the particular measurement is a strongest measurement of the set of measurements.

17. The UE of claim 15, wherein the particular measurement is associated with a quasi-colocation source for the DMRS.

18. The UE of claim 1, wherein the measurement report is associated with a first transmit/receive point (TRP) and a second TRP, and wherein the set of measurements indicates:
  a best measurement associated with each TRP, of the first TRP and the second TRP,
  an average measurement associated with the first TRP and an average measurement associated with the second TRP, and/or
  a combined average measurement associated with the first TRP and the second TRP.

19. The UE of claim 1, wherein the measurement report is associated with a first DMRS port and a second DMRS port, and wherein the set of measurements indicates:
  a best measurement associated with each DMRS port, of the first DMRS port and the second DMRS port,
  an average measurement associated with the first DMRS port and an average measurement associated with the second DMRS port, and/or
  a combined average measurement associated with the first DMRS port and the second DMRS port.

20. The UE of claim 1, wherein the one or more processors are further configured to:
  determine the set of measurements based at least in part on the configuration information.

21. The UE of claim 20, wherein the one or more processors are further configured to:
  transmit, prior to determining the set of measurements, information indicating a recommended type for the measurement report; and
  receive, prior to determining the set of measurements, a reporting setting based at least in part on the recommended type.

22. A base station for wireless communication, comprising:
  one or more memories; and
  one or more processors coupled to the one or more memories, the one or more processors individually or collectively configured to:
    transmit configuration information for a set of measurements to be determined based at least in part on a demodulation reference signal (DMRS) transmitted via a set of beams,
      wherein the configuration information indicates a number N and a rule,
      wherein the rule indicates that a measurement report is to be generated based on DMRS symbols included in the number N slots or mini-slots occurring before a time reference and/or after the time reference, and
      wherein the measurement report indicates the set of measurements;
    transmit the DMRS via the set of beams; and
    receive, from a user equipment (UE), the measurement report indicating the set of measurements based at least in part on transmitting the DMRS via the set of beams.

23. The base station of claim 22, wherein the measurement report indicates:
  a measurement based at least in part on a synchronization signal and physical broadcast channel block, and/or
  a measurement based at least in part on a channel state information reference signal.

24. The base station of claim 22, wherein the measurement report is based at least in part on a reporting setting linked to the DMRS transmitted via the set of beams.

25. The base station of claim 22, wherein the measurement report includes a DMRS resource indicator (DMRSRI).

26. A method of wireless communication performed by a user equipment (UE), comprising:
  receiving configuration information for a set of measurements to be determined based at least in part on a demodulation reference signal (DMRS) transmitted via a set of beams,
    wherein the configuration information indicates a number N and a rule,
    wherein the rule indicates that a measurement report is to be generated based on DMRS symbols included in the number N slots or mini-slots occurring before a time reference and/or after the time reference, and
    wherein the measurement report indicates the set of measurements; and
  transmitting the measurement report.

27. The method of claim 26, wherein the measurement report indicates:
  a measurement based at least in part on a synchronization signal and physical broadcast channel block, and/or
  a measurement based at least in part on a channel state information reference signal.

28. The method of claim 26, wherein the configuration information indicates a reporting setting linked to the DMRS transmitted via the set of beams.

29. A method of wireless communication performed by a base station, comprising:
  transmitting configuration information for a set of measurements to be determined based at least in part on a demodulation reference signal (DMRS) transmitted via a set of beams, wherein the configuration information indicates a number N and a rule,
wherein the rule indicates that a measurement report is to be generated based on DMRS symbols included in the number N slots or mini-slots occurring before a time reference and/or after the time reference, and
wherein the measurement report indicates the set of measurements;
transmitting the DMRS via the set of beams;
transmitting the DMRS via the set of beams; and
receiving, from a user equipment (UE), the measurement report indicating the set of measurements based at least in part on transmitting the DMRS via the set of beams.

30. The method of claim 29, wherein the measurement report indicates:
a measurement based at least in part on a synchronization signal and physical broadcast channel block, and/or
a measurement based at least in part on a channel state information reference signal.

* * * * *